US009280146B2

(12) United States Patent
Gahinet et al.

(10) Patent No.: US 9,280,146 B2
(45) Date of Patent: Mar. 8, 2016

(54) MULTI-MODEL, MULTI-OBJECTIVE TUNING OF CONTROL SYSTEMS

(71) Applicant: The MathWorks, Inc., Natick, MA (US)

(72) Inventors: Pascal Gahinet, Hopkinton, MA (US); Pierre Apkarian, Toulouse (FR)

(73) Assignee: The MathWorks, Inc., Natick, MA (US)

(*) Notice: Subject to any disclaimer, the term of this patent is extended or adjusted under 35 U.S.C. 154(b) by 367 days.

(21) Appl. No.: 13/800,581

(22) Filed: Mar. 13, 2013

(65) Prior Publication Data

US 2013/0197677 A1    Aug. 1, 2013

Related U.S. Application Data

(63) Continuation-in-part of application No. 13/026,823, filed on Feb. 14, 2011, now Pat. No. 8,606,375, and a continuation-in-part of application No. 13/456,698, filed on Apr. 26, 2012, now Pat. No. 9,158,291.

(60) Provisional application No. 61/714,380, filed on Oct. 16, 2012.

(51) Int. Cl.
  *G05B 13/02*  (2006.01)
  *G05B 13/04*  (2006.01)
  *H04B 17/391*  (2015.01)
  *H04B 7/04*  (2006.01)

(52) U.S. Cl.
  CPC ........... *G05B 13/021* (2013.01); *G05B 13/042* (2013.01); *G05B 13/047* (2013.01); *H04B 17/391* (2015.01); *H04B 7/0417* (2013.01)

(58) Field of Classification Search
  CPC .. G05B 13/021; G05B 13/042; G05B 13/047; H04B 17/391; H04B 7/0417
  USPC ................................................ 700/37, 50–55
  See application file for complete search history.

(56) References Cited

U.S. PATENT DOCUMENTS 6,438,430 B1 * 8/2002 Martin et al. .................... 700/28
6,631,299 B1 * 10/2003 Patel et al. ....................... 700/37

(Continued)

OTHER PUBLICATIONS

Scherer et al., "Muliobjective Output-Feedback Control via LMI Optimization", iEEE, 1997, pp. 896-911.*

(Continued)

*Primary Examiner* — Robert Fennema
*Assistant Examiner* — Thomas Stevens
(74) *Attorney, Agent, or Firm* — Harrity & Harrity, LLP

(57) ABSTRACT

A device receives a control system model that includes a fixed portion that models elements of a control system to be controlled and a tunable portion that models elements of the control system used to control the elements modeled by the fixed portion. The device receives information that identifies a tunable parameter of the tunable portion of the control system model, a hard constraint associated with the control system model, and a soft constraint associated with the control system model. The hard constraint identifies a first constraint that is to be satisfied, and the soft constraint identifies a second constraint that is to be reduced. The device calculates a parameter value for the tunable parameter by applying an optimization algorithm to the control system model, based on the control system model, the tunable parameter, the hard constraint, and the soft constraint. The device provides the parameter value.

20 Claims, 14 Drawing Sheets

(56) References Cited

U.S. PATENT DOCUMENTS

| | | | | |
|---|---|---|---|---|
| 7,400,933 | B2* | 7/2008 | Rawlings | G05B 13/048 700/28 |
| 7,647,213 | B1* | 1/2010 | Gahinet et al. | 703/2 |
| 7,738,975 | B2* | 6/2010 | Denison et al. | 700/29 |
| 7,890,198 | B1* | 2/2011 | Gahinet | 700/31 |
| 8,467,888 | B2* | 6/2013 | Gahinet | G05B 11/42 700/30 |
| 8,504,175 | B2* | 8/2013 | Pekar et al. | 700/29 |
| 2003/0018399 | A1* | 1/2003 | Havener | G05B 17/02 700/28 |
| 2003/0028266 | A1* | 2/2003 | Jacques | 700/32 |
| 2004/0117766 | A1* | 6/2004 | Mehta et al. | 717/121 |
| 2006/0112382 | A1* | 5/2006 | Glass et al. | 717/168 |
| 2008/0172212 | A1* | 7/2008 | Gahinet et al. | 703/6 |
| 2009/0112335 | A1* | 4/2009 | Mehta et al. | 700/29 |
| 2010/0204808 | A1* | 8/2010 | Thiele | 700/30 |
| 2012/0035748 | A1 | 2/2012 | Gahinet et al. | |
| 2012/0177135 | A1* | 7/2012 | Gahinet et al. | 375/260 |

OTHER PUBLICATIONS

Gahinet et al.,"Software for Modeling and Analysis of Linear Systems with Delays", IEEE, 2004, pp. 5600.*

Copy of PCT Notification of Transmittal of the International Search Report and the Written Opinion of the International Searching Authority issued for International Application No. PCT/US2013/063837, Jan. 16, 2014, 13 pages.

Bakir et al.: "An improved finite element model updating method by the global optimization technique 'Coupled Local Minimizers", Computers and Structures, vol. 86 (2008), pp. 1339-1352, XP022654672.

Wang et al.: "Progressive finite element model calibration of a long-span suspension bridge based on ambient vibration and static measurements", Engineering Structures, vol. 32, No. 9, Sep. 2010, pp. 2546-2556, XP027204300.

Apkarian et al.: "Fixed-order H∞ control design via a partially augmented Lagrangian method", International Journal of Robust and Nonlinear Control, Oct. 2003, pp. 1137-1148, XP055094905.

Michael Trick: "Chapter 4: Constrained Optimization", Aug. 1998, pp. 43-p. 55, XP055094904. Retrieved from the Internet: URL: http://mat.gsia.cmu.edu/classes/QUANT/NOTES/chap4.pdf.

Modak et al.: "Model Updating Using Constrained Optimization", Pergamon Mechanics Research Communications, Aug. 2000, pp. 543-551, XP055095109.

* cited by examiner 831  s = tf('s');
832  wc = 1; % target crossover frequency

% Bandwidth and roll-off
833  R1 = TuningGoal.Gain('r','y',4/s);

% Disturbance rejection
834  R2 = TuningGoal.Rejection('u',wc/s);
835  R2.Focus = [0 0.5];
836  alpha = 5;
837  R2.MinAttenuation = alpha*wc/s;

% Tracking
838  R3 = TuningGoal.Tracking('r','y',2);

839  T1 = systune(T0,R3,[R1 R2]);

Final: Soft = 1.52, Hard = 0.99967, Iterations = 126
841  showTunable(T1)  % 1-DOF PI

C =

Kp + Ki * ---
                    s with Kp = 1.94, Ki = 2.13

FIG. 8B

FIG. 9B 921  open_system('faultTolerantAircraft')

922  OutageCases = [...
     1 1 1 1 1; ... % nominal operational mode
     0 1 1 1 1; ... % right elevator outage
     1 0 1 1 1; ... % left elevator outage
     1 1 0 1 1; ... % right aileron outage
     1 1 1 0 1; ... % left aileron outage
     1 0 0 1 1; ... % left elevator and right aileron outage
     0 1 0 1 1; ... % right elevator and right aileron outage
     0 1 1 0 1; ... % right elevator and left aileron outage
     1 0 1 0 1; ... % left elevator and left aileron outage
     ];

931  We = diag([10 20 15]); Wu = eye(3);

932  % Nominal tracking requirement
     SoftNom = TuningGoal.WeightedVariance('setpoint',{'e','u'},
     blkdiag(We,Wu), []);
     SoftNom.Models = 1; % nominal model 933  % Tracking requirement for outage conditions
     SoftOut = TuningGoal.WeightedVariance('setpoint',{'e','u'},
     blkdiag(We/2,Wu), []);
     SoftOut.Models = 2:9; % outage scenarios 934  % Nominal gust alleviation requirement
     HardNom = TuningGoal.Variance('wg', 'e',0.02);
     HardNom.Models = 1;

935  % Gust alleviation requirement for outage conditions
     HardOut = TuningGoal.Variance('wg','e',0.1);
     HardOut.Models = 2:9;

936  GustSpeed = 10;
     Ki = eye(3);
     Kx = zeros(3,6);

900

940

941  clear T0
     for k = 9:-1:1
        outage = OutageCases(k,:);
        ST = slTunable('faultTolerantAircraft',{'Ki','Kx'});
        T0(:,:,k) = ST.getIOTransfer({'setpoint','wg'},{'e','u'});
     End 942  [T,fSoft,gHard] = systune(T0(:,:,1),SoftNom,HardNom);
943  | Final: Soft = 22.6, Hard = 0.99662, Iterations = 215 |

944  [T,fSoft,gHard] = systune(T0,[SoftNom;SoftOut],[HardNom;HardOut]);
945  | Final: Soft = 25.7, Hard = 0.99987, Iterations = 379 |

FIG. 9D

MULTI-MODEL, MULTI-OBJECTIVE TUNING OF CONTROL SYSTEMS

RELATED APPLICATION

This application claims priority under 35 U.S.C. §119 based on U.S. Provisional Patent Application No. 61/714,380, filed on Oct. 16, 2012, the content of which is incorporated by reference herein in its entirety. This application is also a continuation-in-part of U.S. patent application Ser. No. 13/026,823, filed on Feb. 14, 2011, the content of which is incorporated by reference herein in its entirety. This application is also a continuation-in-part of U.S. patent application Ser. No. 13/456,698, filed on Apr. 26, 2012, the content of which is incorporated by reference herein in its entirety.

BRIEF DESCRIPTION OF THE DRAWINGS

FIGS. 8A and 8B are diagrams of another example implementation relating to the process shown in FIG. 5; and FIGS. 9A-9D are diagrams of yet another example implementation relating to the process shown in FIG. 5.

DETAILED DESCRIPTION

The following detailed description of example implementations refers to the accompanying drawings. The same reference numbers in different drawings may identify the same or similar elements.

A designer of a control system may create a mathematical model of the control system to analyze performance of the control system under various system constraints. Such analysis of the control system may assist the designer in designing a control system that provides maximum performance subject to the constraints. However, the designer may have difficulty constructing or analyzing a model of the control system when the control system can be described using several different models, or when the control system is subject to multiple constraints, some of which may be flexible (soft) and some of which may be inflexible (hard). Implementations described herein may assist a control system designer in designing a control system that may be described according to different models, and that may be subject to flexible and inflexible constraints.

Figure 1:
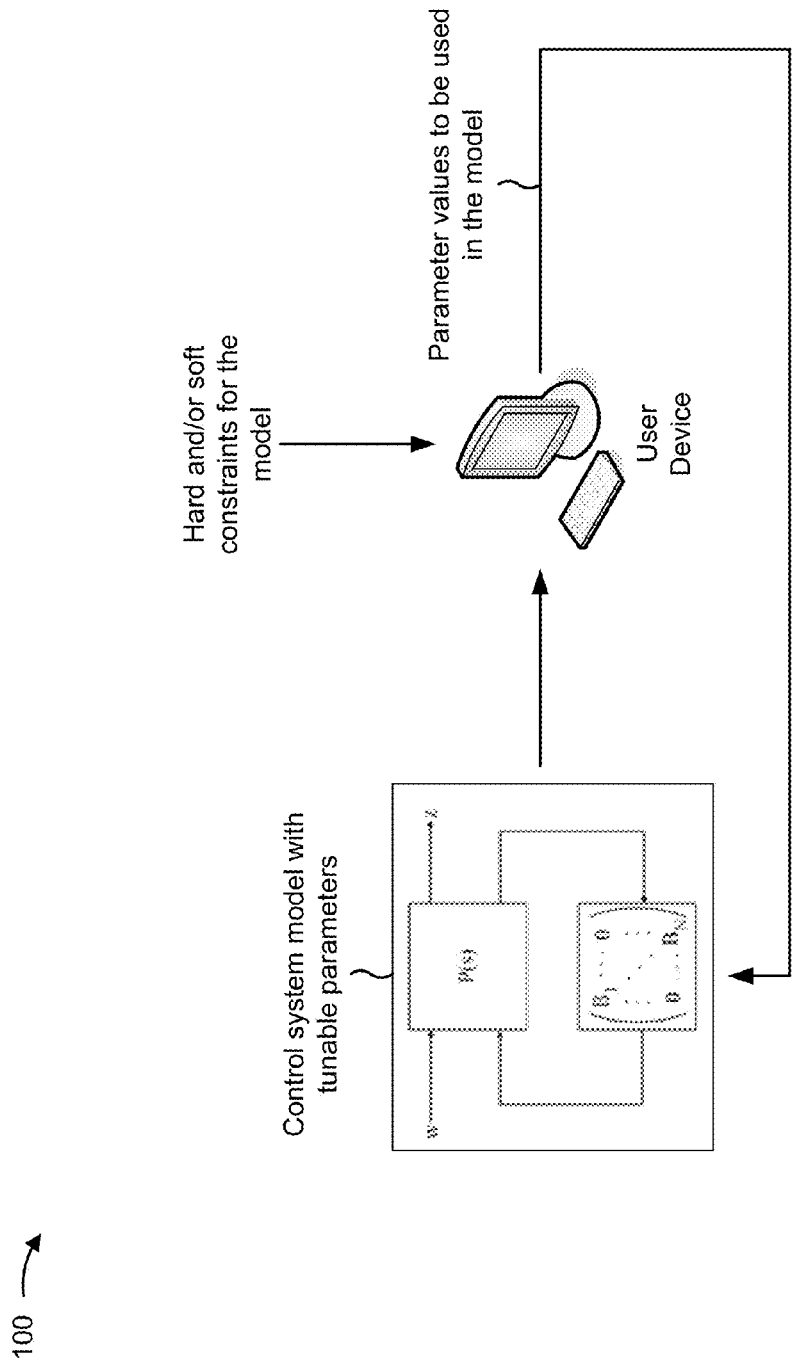
FIG. 1 is a diagram of an overview of an example implementation described herein.

FIG. 1 is a diagram of an overview of an example implementation 100 described herein. As shown in FIG. 1, a user (e.g., a control system designer) may create a control system model that includes tunable parameters. The control system model (sometimes referred to herein as "a model" or "the model") may describe, for example, elements of the control system, an interaction between elements of the control system, a transfer function that describes how outputs of the control system are generated from inputs to the control system, and/or parameters of the control system that affect the operation or behavior of the control system. The user may identify parameters of the control system that may be tuned (adjusted), referred to herein as tunable parameters. The control system model and information that identifies the tunable parameters may be input to a user device.

The user may also input, to the user device, hard constraints and/or soft constraints for the control system model. A hard constraint may refer to an inflexible constraint that the control system must satisfy. A soft constraint may refer to a flexible constraint, such as a minimization or maximization of a parameter value. Based on the control system model, the tunable parameters, and the hard and/or soft constraints, the user device may determine parameter values for the tunable parameters that maximize performance of the control system subject to the constraints. The user device may apply the determined parameter values to the control system model, and may simulate the model using the parameter values.

Figure 2:
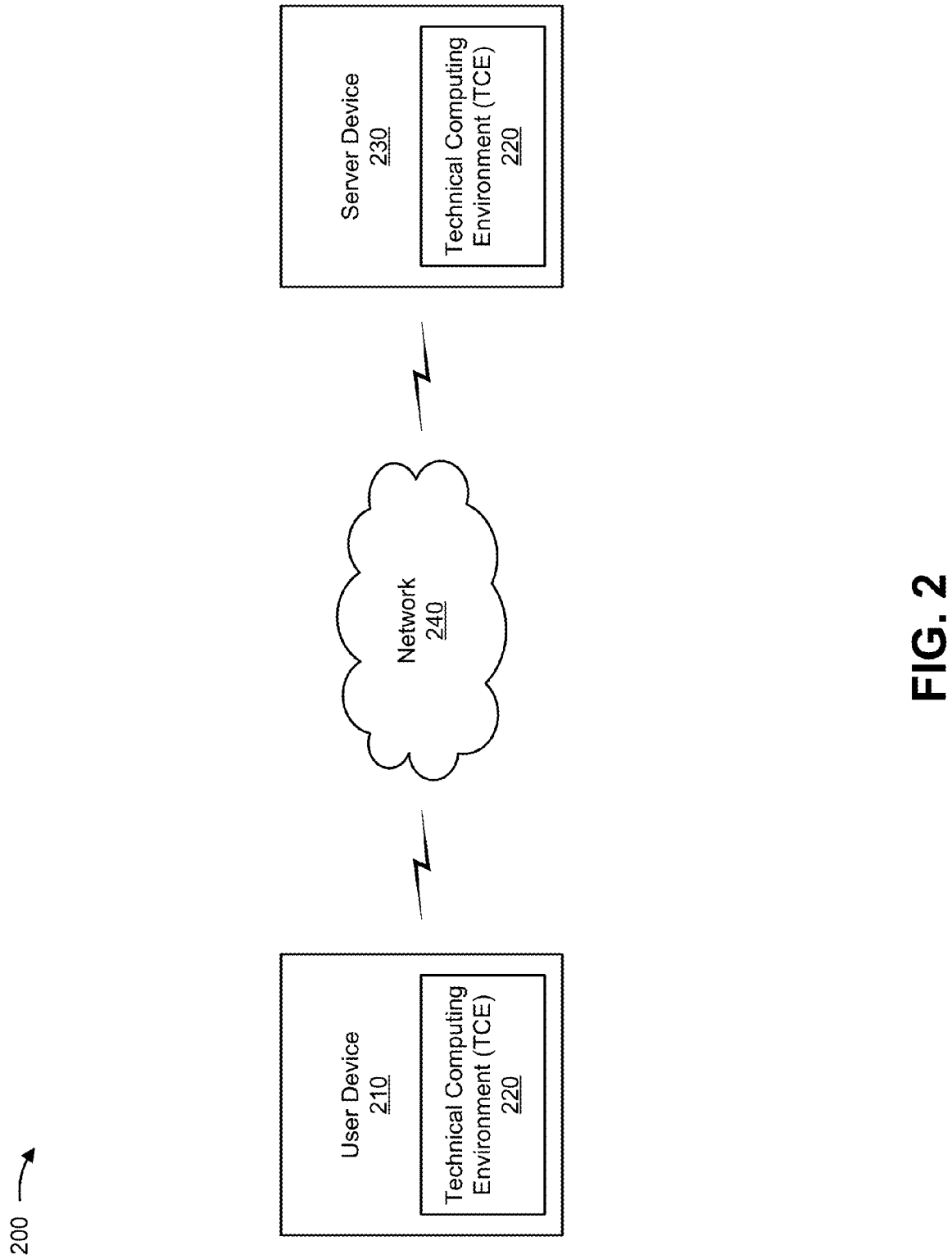
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a user device 210, which may include a technical computing environment (TCE) 220. Furthermore, environment 200 may include a server device 230, which may include TCE 220, and a network 240. Devices of environment 200 may interconnect via wired connections, wireless connections, or a combination of wired and wireless connections.

User device 210 may include a device capable of receiving, creating, processing, and/or providing information associated with a model, such as a control system model. For example, user device 210 may include a computing device (e.g., a desktop computer, a laptop computer, a tablet computer, a handheld computer, a server, etc.), a mobile phone (e.g., a smart phone, a radiotelephone, etc.), or a similar device. In some implementations, user device 210 may receive information from and/or transmit information to server device 230 (e.g., information associated with a control system model).

User device 210 may host TCE 220. TCE 220 may include any hardware-based logic or a combination of hardware and software-based logic that provides a computing environment that allows tasks to be performed (e.g., by users) related to disciplines, such as, but not limited to, mathematics, science, engineering, medicine, and business. TCE 220 may include a text-based environment (e.g., MATLAB® software), a graphically-based environment (e.g., Simulink® software, Stateflow® software, SimEvents® software, etc., by The MathWorks, Inc.; VisSim by Visual Solutions; LabView® by National Instruments; etc.), or another type of environment, such as a hybrid environment that may include, for example, a text-based environment and a graphically-based environment.

In some implementations, the text-based environment may include a dynamically typed language that may be used to express problems and/or solutions in mathematical notations. For example, the text-based environment may use an array as a basic element, where the array may not require dimensioning. These arrays may be used to support array programming in that operations can apply to an entire set of values, such as values in an array. Array programming may allow array-based operations to be treated as a high-level programming technique or model that lets a programmer think and operate on whole aggregations of data without having to resort to explicit loops of individual non-array, i.e., scalar operations.

Server device 230 may include one or more devices capable of receiving, storing, processing, and/or transmitting information associated with a model, such as a control system model. For example, server device 230 may include a computing device, such as a server, a desktop computer, a laptop computer, a tablet computer, a handheld computer, or a similar device. In some implementations, server device 230 may host TCE 220.

Network 240 may include one or more wired and/or wireless networks. For example, network 240 may include a cellular network, a public land mobile network ("PLMN"), a local area network ("LAN"), a wide area network ("WAN"), a metropolitan area network ("MAN"), a telephone network (e.g., the Public Switched Telephone Network ("PSTN")), an ad hoc network, an intranet, the Internet, a fiber optic-based network, and/or a combination of these or other types of networks.

The number of devices and/or networks shown in FIG. 2 is provided as an example. In practice, there may be additional, fewer, different, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

Figure 3:
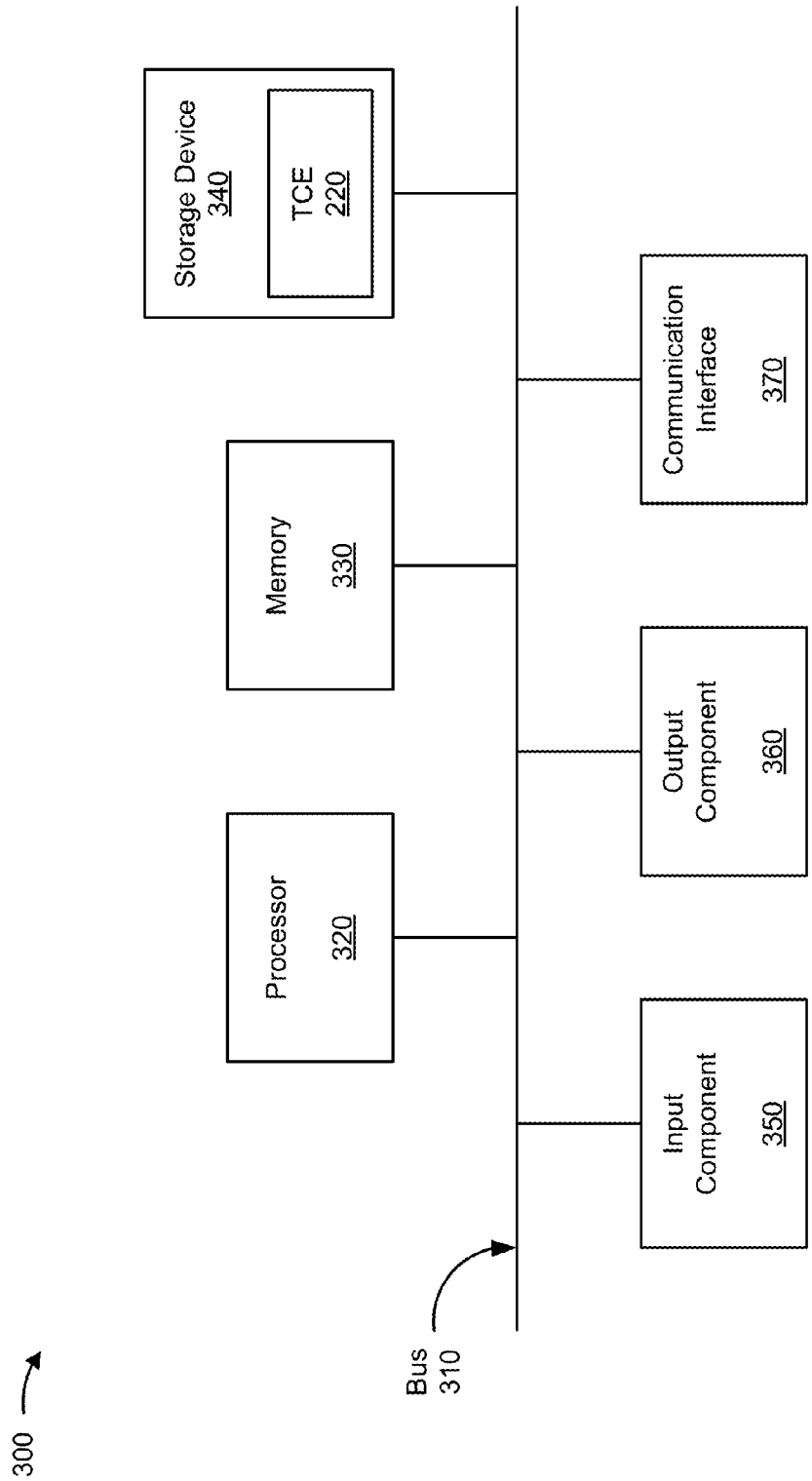
FIG. 3 is a diagram of example components of one or more devices of FIG. 2.

FIG. 3 is a diagram of example components of a device 300, which may correspond to user device 210 and/or server device 230. In some implementations, each of user device 210 and/or server device 230 may include one or more devices 300 and/or one or more components of device 300. As shown in FIG. 3, device 300 may include a bus 310, a processor 320, a memory 330, a storage device 340, an input component 350, an output component 360, and a communication interface 370.

Bus 310 may include a path that permits communication among the components of device 300. Processor 320 may include a processor (e.g., a central processing unit, a graphics processing unit, an accelerated processing unit, etc.), a microprocessor, and/or any processing logic (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash, magnetic, or optical memory) that stores information and/or instructions for use by processor 320.

Storage device 340 may store information and/or software related to the operation and use of device 300. For example, storage device 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive. In some implementations, storage device 340 may store TCE 220.

Input component 350 may include a component that permits a user to input information to device 300 (e.g., a touch screen display, a keyboard, a keypad, a mouse, a button, a switch, etc.). Output component 360 may include a component that outputs information from device 300 (e.g., a display, a speaker, one or more light-emitting diodes (LEDs), etc.).

Communication interface 370 may include a transceiver-like component, such as a transceiver and/or a separate receiver and transmitter, that enables device 300 to communicate with other devices, such as via a wired connection, a wireless connection, or a combination of wired and wireless connections. For example, communication interface 370 may include an Ethernet interface, an optical interface, a coaxial interface, an infrared interface, a radio frequency (RF) interface, a universal serial bus (USB) interface, or the like.

Device 300 may perform various operations described herein. Device 300 may perform these operations in response to processor 320 executing software instructions included in a computer-readable medium, such as memory 330 and/or storage device 340. A computer-readable medium may be defined as a non-transitory memory device. A memory device may include memory space within a single physical storage device or memory space spread across multiple physical storage devices.

Software instructions may be read into memory 330 and/or storage device 340 from another computer-readable medium or from another device via communication interface 370. When executed, software instructions stored in memory 330 and/or storage device 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided as an example. In practice, device 300 may include additional, fewer, different, or differently arranged components than those shown in FIG. 3. Additionally, or alternatively, one or more components of device 300 may perform one or more functions described as being performed by another one or more components of device 300.

Figure 4:
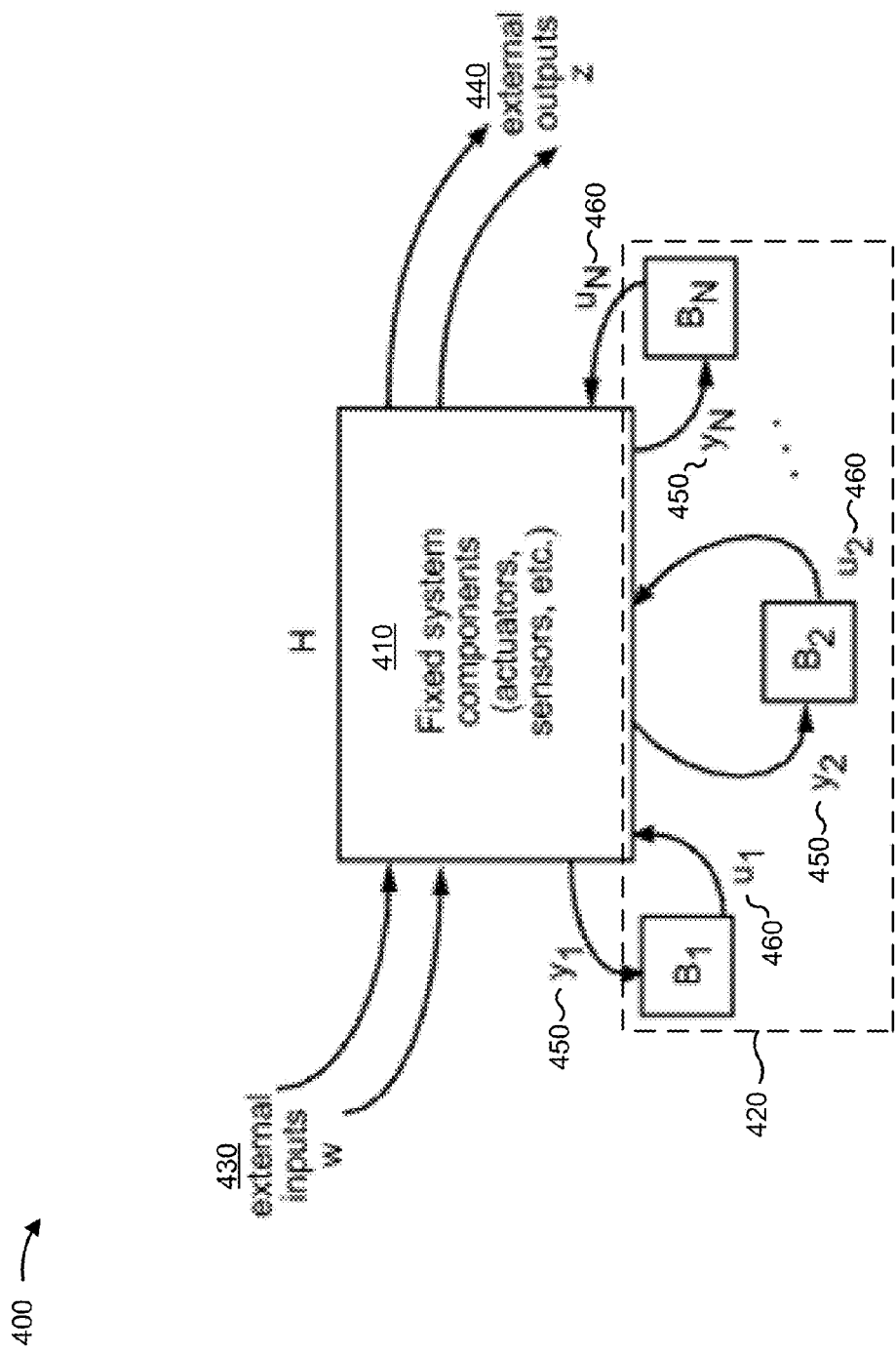
FIG. 4 is a diagram of an example control system model.

FIG. 4 is a diagram of an example control system model 400, which may be created, received, stored, processed, and/or provided by user device 210 and/or server device 230. Control system model 400 may include a fixed portion (H) 410, a tunable portion (B) 420 (which may include tunable parameters $B_1, B_2, \ldots, B_N$), an input signal (w) 430, an output signal (z) 440, a feedback signal (y) 450 (which may include feedback signals $y_1, y_2, \ldots, y_N$), and a control signal (u) 460 (which may include control signals $u_1, u_2, \ldots, u_N$).

Control system model 400 may include a model of a physical system to be controlled and/or the actuators that are used to physically interact with the physical system. Examples of physical systems that may be modeled by control system model 400 may include motors, robots, machinery, etc. Examples of actuators that may be modeled by control system model 400 include valves, pistons, relays, etc. In some implementations, control system model 400 may include a graphically-based model (e.g., a block diagram model), and/or a text-based model (e.g., a matrix model). Additionally, or alternatively model 400 may represent a linear time-invariant system.

Fixed portion 410 may represent elements of model 400 that are fixed (e.g., non-tunable) and/or interconnections between the fixed elements. The fixed elements may include, for example, actuators, sensors, and/or other non-tunable elements. When control system model 400 is represented in mathematical terms, fixed portion 410 may represent terms of model 400 that have fixed coefficients. In some implementations, fixed portion 410 may include a state space model, a frequency response data model, and/or a matrix model.

Tunable portion 420 may represent tunable (e.g., adjustable) elements of model 400, and/or interconnections between the tunable elements. The tunable parameters may include, for example, filters, compensators, dampers, attenuators, amplifiers, etc. When control system model 400 is represented in mathematical terms, tunable portion 420 may represent terms of model 400 that have variable coefficients. Tunable portion 420 may include tunable parameters $B_1, \ldots, B_N$, as shown in FIG. 4. In some implementations, the tunable parameters may be represented as a diagonal matrix, in which matrix elements outside of the main diagonal are zero:

$$\begin{bmatrix} B1 & \ldots & 0 \\ \vdots & \ddots & \vdots \\ 0 & \ldots & BN \end{bmatrix}.$$

In some implementations, user device 210 may convert control system model 400 and/or tunable portion 420 into the above diagonal matrix representation, regardless of the type of control architecture or the nature of the control elements in control system model 400.

Control system model 400 may receive input signal 430, and may generate output signal 440 based on input signal 430. In some implementations, fixed portion 410 and/or tunable portion 420 may act on input signal 430 to generate output signal 440. Additionally, or alternatively, fixed portion 410 may generate feedback signal 450, which may be equivalent to output signal 440 in some implementations. Tunable portion 420 may receive feedback signal 450, and may generate control signal 460 based on feedback signal 450. For example, feedback signal 450 may represent an error associated with output signal 440, and control signal 460 may compensate for the error. In this manner, tunable portion 420 may measure a behavior of an element of fixed portion 410 (e.g., via feedback signal 450), and may transmit control signal 460 to the element to adjust the behavior. For example, control signal 460 may be combined with input signal 430. The combined signal may be input to fixed portion 410, which may generate output signal 440 based on the combined signal.

In some implementations, input signal (w) 430, output signal (z) 440, feedback signal (y) 450, and/or control signal (u) 460 may be represented as vectors and/or matrices (e.g., diagonal matrices). For example, signals 430-460 may be represented as follows:

$w=[w_1, \ldots, w_X]$ $z=[z_1, \ldots, z_Y]$ $u=[u_1, \ldots, u_N]$ $y=[y_1, \ldots, y_N]$, where $X \geq 1$, $Y \geq 1$, and $N \geq 1$.

Control system model 400 may include a closed loop, where tunable portion 420 adjusts input signal 430 (e.g., via control signal 460) based on feedback signal 450. In some implementations, control system model 400 may include an open loop, where tunable portion 420 generates an open loop signal, input to fixed portion 410, based solely on information not received from fixed portion 410. In some implementations, control system model 400 may include a combination of closed loops and open loops.

The number of elements, signals, and parameters shown in FIG. 4 is provided as an example. In practice, control system model 400 may include additional, fewer, different, or differently arranged elements, signals, and/or parameters than those shown in FIG. 4.

Figure 5:
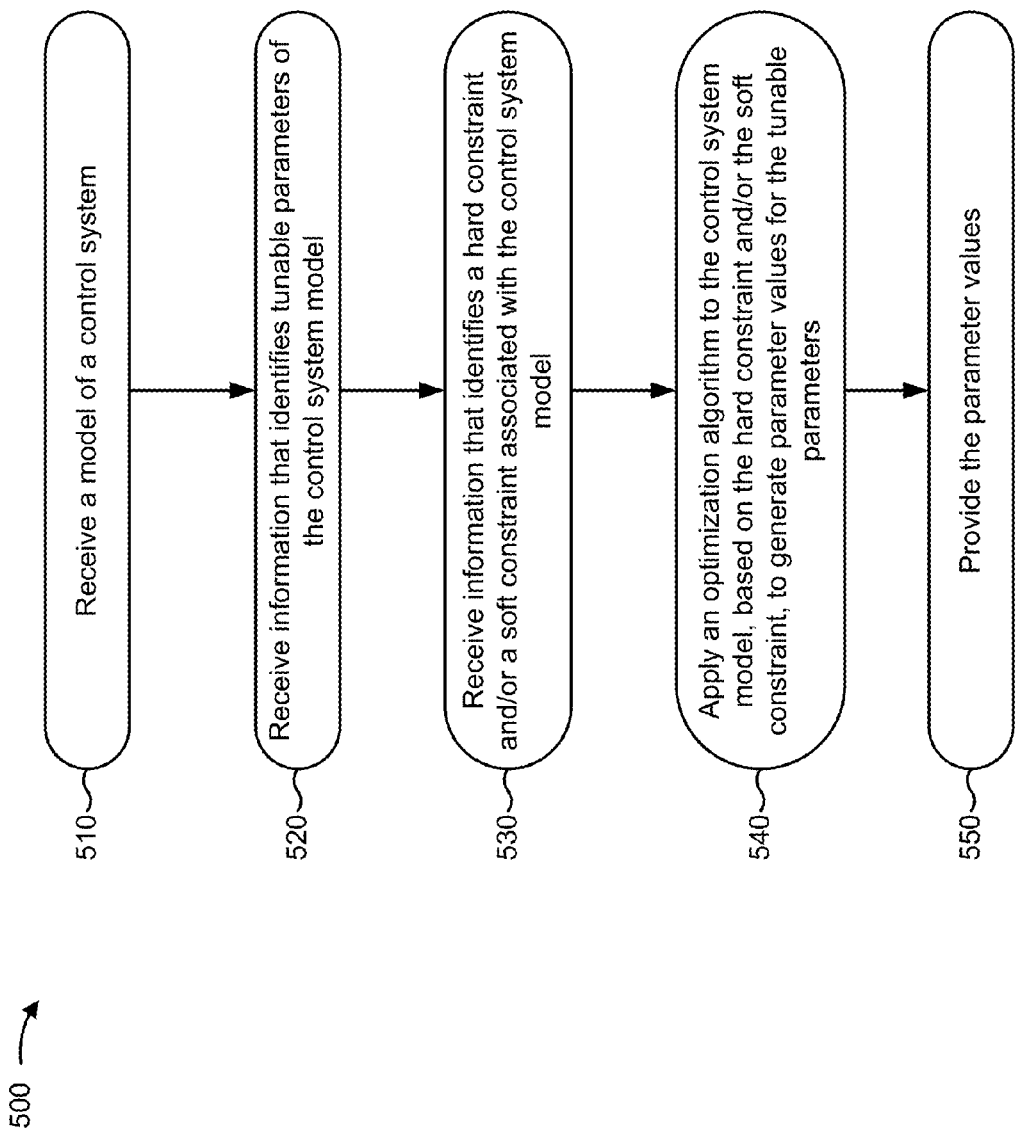
FIG. 5 is a flow chart of an example process for generating parameter values for a control system model.

FIG. 5 is a flow chart of an example process 500 for generating parameter values for a control system model. In some implementations, one or more process blocks of FIG. 5 may be performed by user device 210. In some implementations, one or more process blocks of FIG. 5 may be performed by another device or a group of devices separate from or including user device 210, such as server device 230.

As shown in FIG. 5, process 500 may include receiving a model of a control system (block 510). For example, user device 210 (e.g., TCE 220) may receive a request, from a user of user device 210, to access the model, such as control system model 400. The request may include information identifying model 400, such as a name of model 400, and information identifying a memory location at which model 400 is stored. The memory location may be located within user device 210 or external to, and possibly remote from, user device 210. User device 210 may, based on receiving the request, retrieve model 400 from the memory location. In some implementations, user device 210 may provide, for display, a user interface that depicts all or a portion of model 400. Model 400 may include a model of a control system that a user wants to analyze, such as a circuit, an amplifier, a filter, a mixer, an oscillator, or the like.

In some implementations, model 400 may be represented as a block diagram model created using user device 210 and/or another device. Additionally, or alternatively, model 400 may be represented as a linear time-invariant (LTI) model (e.g., a numeric LTI model, a generalized LTI model, a generalized state-space model, etc.) created using user device 210 and/or another device. Model 400 may describe, for example, elements of the control system, an interaction between elements of the control system, a transfer function that describes how output signal 440 is generated from input signal 430 and/or other signals, a transfer function that describes how control signal 460 is generated from feedback signal 450 and/or other signals, and/or parameters of the control system that affect the operation or behavior of the control system.

In some implementations, the control system model, received by user device 210, may include a representation of multiple models 400, such as models of a control system with an element experiencing different degrees of degradation and/or operating at different performance levels. The representation of multiple models 400 may be represented, for example, as an array (e.g., a vector and/or a matrix) of multiple model objects.

As shown in FIG. 5, process 500 may include receiving information that identifies tunable parameters of the control system model (block 520). For example, user device 210 may receive, from a user and/or another device, information that identifies tunable parameters of control system model 400 (e.g., tunable portion 420). In some implementations, the user may specify the tunable parameters by specifying one or more elements (e.g., blocks) of model 400 (e.g., a block diagram model). For example, user device 210 may receive program code that specifies a parameter "a" as a tunable parameter. The program code may include the following syntax:

$a$=realp('$a$',10).

This syntax may designate an object a as a tunable parameter with an initial value of 10.

User device 210 may receive additional program code to create a block that represents a low-pass filter with tunable parameter a, such as:

$F$=tf($a$,[1 $a$]).

In this example, F represents a low-pass filter modeled by the equation $F=a/(s+a)$, where a represents a tunable parameter of the low-pass filter. In some implementations, user device 210 may receive information that identifies additional blocks, and may combine the additional blocks with the low-pass filter block to create control system model 400 with one or more tunable and/or non-tunable parameters.

As further shown in FIG. 5, process 500 may include receiving information that identifies a hard constraint and/or a soft constraint associated with the control system model (block 530). For example, user device 210 may receive, from a user and/or another device, information that identifies a hard constraint and/or a soft constraint. A hard constraint may refer to an inflexible constraint that the control system must satisfy. A soft constraint may refer to a flexible constraint, such as a minimization or maximization of a parameter value. When model 400 includes multiple models, a constraint may apply to all of the models or a subset of the models (e.g., a subset specified by a user). In some implementations, the constraints may include closed-loop constraints and/or open-loop constraints. Closed-loop constraints may apply to a subset of the elements of the closed-loop model (e.g., modeled by transfer function T(s)). Open-loop constraints may be applicable to any element of the model.

The hard and/or soft constraints may include, for example, a setpoint tracking requirement (e.g., input via a TuningGoal.Tracking object), a disturbance rejection requirement (e.g., input via a TuningGoal.Rejection object), a limit on overshoot in a step response (e.g., input via a TuningGoal.Overshoot object), a limit on transfer function gain (e.g., using H-infinity techniques, input via a TuningGoal.Gain object), a limit on frequency-weighted transfer function gain (e.g., input via a TuningGoal.WeightedGain object), a limit on signal variance amplification (e.g., using H-2 techniques, input via a TuningGoal.Variance object), a limit on frequency-weighted variance amplification (e.g., input via a TuningGoal.WeightedVariance object), a minimum gain for open-loop response (e.g., input via a TuningGoal.MinLoopGain object), a maximum gain for open-loop response (e.g., input via a TuningGoal.MaxLoopGain object), a target shape for open-loop response (e.g., input via a TuningGoal.LoopShape object), a limit on sensitivity of a single-input single-output (SISO) or multiple-input multiple-output (MIMO) loop (e.g., input via a TuningGoal.Sensitivity object), a minimum stability margin for a SISO or MIMO loop (e.g., input via a TuningGoal.Margins object), a constraint on closed-loop dynamics (e.g., input via a TuningGoal.Poles object), a constraint on controller dynamics (e.g., input via a TuningGoal.StableController object), and/or another type of constraint.

The hard and/or soft constraint may include, for example, a constraint on the gain of a transfer function (e.g., a relationship between an output signal and an input signal) associated with model 400. For example, the hard constraint may include limiting the gain of the transfer function at or below a particular threshold value (e.g., a normalized value of 1), and may be represented as:

$$\|w(s)^{-1}T_j(s)\|_\infty < 1$$

where $w(s)$ represents a weighting function specifying the maximum gain as a function of frequency, and $T_j(s)$ represents a transfer function associated with a closed loop j of model 400, which may be represented as an array of transfer functions $[T_1(s), \ldots, T_J(s)]$. The soft constraint may include minimizing the gain of the transfer function, and may be represented as:

$$f_j(x) = \|w(s)^{-1}T_j(s)\|_{2\delta}$$

where $f_j(x)$ represents a j-th soft constraint of a set of soft constraints $[f_1(x), \ldots, f_J(x)]$.

In some implementations, the constraint on the gain of the transfer function may be input as program code, via a TuningGoal.Gain object, with the following properties:

| | Class: TuningGoal.Gain |
|---|---|
| | Purpose: Minimize or limit the gain of a transfer function $T_j(s)$: |
| | Soft: $f_j(x) = \|w(s)^{-1}T_j(s)\|_\infty$ |
| | Hard: $\|w(s)^{-1}T_j(s)\|_\infty < 1$ |

| Properties | Meaning |
|---|---|
| Input | Input channels of $T_j(s)$ relative to overall closed-loop model T(s) (specified by name) |
| Output | Output channels of $T_j(s)$ relative to overall closed-loop model T(s) |
| MaxGain | Weighting function w(s) specifying the maximum gain as a function of frequency. This weighting function may be, for example, stored as a zero-pole-gain (e.g., "ZPK") model and can be specified as a constant value or a frequency response data (e.g., "FRD") model with a few frequency points to outline the desired gain profile. |
| Focus | Frequency interval of interest (default = [0, Inf]). |
| Name | Requirement name |
| Models | Models to which the requirement applies (in multi-model context). Default value NaN means "all models" |
| Openings | Loop openings to be enforced when evaluating this requirement |

As another example, the hard and/or soft constraint may include a constraint on the gain of a weighted multiple-input and multiple-output (MIMO) transfer function associated with model 400. For example, the hard constraint may include limiting the gain of the weighted MIMO transfer function at or below a particular threshold value (e.g., a normalized value of 1), and may be represented as:

$$\|W_L(s)T_j(s)W_R(s)\|_\infty < 1$$

where $W_L(s)$ represents a left weighting function (e.g., a weighting function applied to the multiple inputs) specifying the maximum gain as a function of frequency, $W_R(s)$ represents a right weighting function (e.g., a weighting function applied to the multiple outputs) specifying the maximum gain as a function of frequency, and $T_j(s)$ represents a transfer function associated with a closed loop j of model 400. The soft constraint may include minimizing the gain of the weighted MIMO transfer function, and may be represented as:

$$f_j(x) = \|W_L(s)T_j(s)W_R(s)\|_\infty$$

where $f_j(x)$ represents a j-th soft constraint of a set of soft constraints $[f_1(x), \ldots, f_J(x)]$.

In some implementations, the constraint on the gain of the weighted MIMO transfer function may be input as program code, via a TuningGoal.WeightedGain object, with the following properties:

| | Class: TuningGoal.WeightedGain |
|---|---|
| | Purpose: Minimize or limit the gain of a MIMO transfer function $T_j(s)$: |
| | Soft: $f_j(x) = \|W_L(s)T_j(s)W_R(s)\|_\infty$ |
| | Hard: $\|W_L(s)T_j(s)W_R(s)\|_\infty < 1$ |

| Properties | Meaning |
|---|---|
| Input | Input channels of $T_j(s)$ relative to overall closed-loop model T(s) |
| Output | Output channels of $T_j(s)$ relative to overall closed-loop model T(s) |
| Focus | Frequency interval of interest (default = [0, Inf]). |
| WL | Left weighting function (e.g., of a state space model) |
| WR | Right weighting function (e.g., of a state space model) |

-continued

| Class: TuningGoal.WeightedGain |
|---|
| Purpose: Minimize or limit the gain of a MIMO transfer function $T_j(s)$: |
| Soft: $f_j(x) = \|W_L(s)T_j(s)W_R(s)\|_\infty$ |
| Hard: $\|W_L(s)T_j(s)W_R(s)\|_\infty < 1$ |

| Properties | Meaning |
|---|---|
| Name | Requirement name |
| Models | Models to which the requirement applies (in multi-model context). Default value NaN means "all models" |
| Openings | Loop openings to be enforced when evaluating this requirement |

As another example, the hard and/or soft constraint may include a constraint on a tracking error (e.g., a difference between an output signal and an input signal) associated with model 400. For example, the hard constraint may include limiting the tracking error at or below a particular threshold value (e.g., a normalized value of 1), and may be represented as:

$$\|w(s)^{-1}(1-T_j(s))\|_\infty < 1$$

where $w(s)$ represents a weighting function specifying the maximum tracking error as a function of frequency (e.g., a gain from a reference signal to an error signal), and $T_j(s)$ represents a transfer function associated with a closed loop j of model 400. The soft constraint may include minimizing the tracking error, and may be represented as:

$$f_j(x) = \|w(s)^{-1}(1-T_j(s))\|_\infty$$

where $f_j(x)$ represents a j-th soft constraint of a set of soft constraints $[f_1(x), \ldots f_j(x)]$.

In some implementations, the constraint on the tracking error may be input as program code, via a TuningGoal.Tracking object, with the following properties:

| Class: TuningGoal.Tracking |
|---|
| Purpose: Minimize or constraint the tracking error |
| Soft: $f_j(x) = \|w(s)^{-1}(I - T_j(s))\|_\infty$ |
| Hard: $\|w(s)^{-1}(I - T_j(s))\|_\infty < 1$ |

| Properties | Meaning |
|---|---|
| ReferenceInput | Name of reference signals relative to overall closed-loop model T(s) |
| TrackingOutput | Name of tracking signals relative to overall closed-loop model T(s) |
| Focus | Frequency interval of interest (default = [0, Inf]). |
| MaxError | Maximum tracking error w(s) as a function of frequency (gain from reference signal to error signal) This weighting function may be stored, for example, as a ZPK model and can be specified as a constant value or an FRD model with a few frequency points to outline the desired gain profile. |
| Name | Requirement name |
| Models | Models to which the requirement applies (in multi-model context). Default value NaN means "all models" |
| Openings | Loop openings to be enforced when evaluating this requirement |

As another example, the hard and/or soft constraint may include a constraint on disturbance attenuation (e.g., a disturbance-to-output gain) associated with model 400. For example, the hard constraint may include limiting the disturbance attenuation at or below a particular threshold value (e.g., a normalized value of 1), and may be represented as:

$$\|w(s)S_d(s)\|_\infty < 1$$

where $w(s)$ represents a weighting function specifying the maximum disturbance attenuation as a function of frequency (e.g., a gain from an input signal to a feedback signal), and $S_d(s)$ represents a sensitivity function at a disturbance input of model 400. The soft constraint may include minimizing the disturbance attenuation, and may be represented as:

$$f_j(x) = \|w(s)S_d(s)\|_\infty$$

where $f_j(x)$ represents a j-th soft constraint of a set of soft constraints $[f_1(x), \ldots f_j(x)]$.

In some implementations, the constraint on disturbance attenuation may be input as program code, via a TuningGoal.Rejection object, with the following properties:

| Class: TuningGoal.Rejection |
|---|
| Purpose: Maximize or ensure minimum disturbance attenuation |
| Soft: $f_j(x) = \|w(s)S_d(s)\|_\infty$ |
| Hard: $\|w(s)S_d(s)\|_\infty < 1$ |

| Properties | Meaning |
|---|---|
| DisturbanceInput | Location where disturbance enters (may be a registered loop switch in order to access the sensitivity function at point of entry of the disturbance) |
| Focus | Frequency interval of interest (default = [0, Inf]). |
| MinAttenuation | Minimum disturbance attenuation factor w(s) as a function of frequency (when compared to open-loop behavior). Reciprocal of the attenuation factor specifies the maximum gain of the sensitivity function at the disturbance input. This weighting function may be, for example, stored as a ZPK model and can be specified as a constant value or an FRD model with a few frequency points to outline the desired gain profile. |
| Name | Requirement name |
| Models | Models to which the requirement applies (in multi-model context). Default value NaN means "all models" |
| Openings | Loop openings to be enforced when evaluating this requirement |

As another example, the hard and/or soft constraint may include a constraint on variance amplification of a transfer function (e.g., stochastic gain from input to output) associated with model 400. For example, the hard constraint may include limiting the variance amplification of the transfer function at or below a particular threshold value (e.g., a normalized value of 1), and may be represented as:

$$\|T_j(s)\|_2 < \alpha$$

where $\alpha$ represents a threshold value for the variance amplification, and $T_j(s)$ represents a transfer function associated with a closed loop j of model 400. The soft constraint may include minimizing the variance amplification of the transfer function, and may be represented as:

$$f_j(x) = \left\|\left(\frac{1}{\alpha}\right)T_j(s)\right\|_2$$

where $f_j(x)$ represents a j-th soft constraint of a set of soft constraints $[f_1(x), \ldots f_j(x)]$.

In some implementations, the constraint on variance amplification may be input as program code, via a TuningGoal.Variance object, with the following properties:

| Class: TuningGoal.Variance |
|---|
| Purpose: Minimize or limit the variance amplification for the transfer function $T_j(s)$. |
| Soft: $f_j(x) = \|(1/\alpha)T_j(s)\|_2$ |
| Hard: $\|T_j(s)\|_2 < \alpha$ |

| Properties | Meaning |
|---|---|
| Input | Input channels of $T_j(s)$ relative to overall closed-loop model $T(s)$ (specified by name) |
| Output | Output channels of $T_j(s)$ relative to overall closed-loop model $T(s)$ |
| MaxAmplification | Maximum variance amplification (scalar, default = 1) |
| Focus | Frequency interval of interest (default = [0, Inf]). |
| Name | Requirement name |
| Models | Models to which the requirement applies (in multi-model context). Default value NaN means "all models" |
| Openings | Loop openings to be enforced when evaluating this requirement |

As another example, the hard and/or soft constraint may include a constraint on the variance amplification of a weighted multiple-input and multiple-output (MIMO) transfer function associated with model 400. For example, the hard constraint may include limiting the variance amplification of the weighted MIMO transfer function at or below a particular threshold value (e.g., a normalized value of 1), and may be represented as:

$$\|W_L(s)T_j(s)W_R(s)\|_2 < 1$$

where $W_L(s)$ represents a left weighting function (e.g., a weighting function applied to the multiple inputs) specifying the maximum variance amplification as a function of frequency, $W_R(s)$ represents a right weighting function (e.g., a weighting function applied to the multiple outputs) specifying the maximum variance amplification as a function of frequency, and $T_j(s)$ represents a transfer function associated with a closed loop j of model 400. The soft constraint may include minimizing the variance amplification of the weighted MIMO transfer function, and may be represented as:

$$f_j(x) = \|W_L(s)T_j(s)W_R(s)\|_2$$

where $f_j(x)$ represents a j-th soft constraint of a set of soft constraints $[f_1(x), \ldots f_j(x)]$.

In some implementations, the constraint on variance amplification of a weighted multiple-input and multiple-output (MIMO) transfer function may be input as program code, via a TuningGoal.WeightedVariance object, with the following properties:

| Class: TuningGoal.WeightedVariance |
|---|
| Purpose: Minimize or limit the variance amplification for the MIMO transfer function $T_j(s)$. |
| Soft: $f_j(x) = \|W_L(s)T_j(s)W_R(s)\|_2$ |
| Hard: $\|W_L(s)T_j(s)W_R(s)\|_2 < 1$ |

| Properties | Meaning |
|---|---|
| Input | Input channels of $T_j(s)$ relative to overall closed-loop model $T(s)$ |
| Output | Output channels of $T_j(s)$ relative to overall closed-loop model $T(s)$ |
| Focus | Frequency interval of interest (default = [0, Inf]). |
| WL | Left weighting function (e.g., of a state space model) |
| WR | Right weighting function (e.g., of a state space model) |
| Name | Requirement name |
| Models | Models to which the requirement applies (in multi-model context). Default value NaN means "all models" |

| Class: TuningGoal.WeightedVariance |
|---|
| Purpose: Minimize or limit the variance amplification for the MIMO transfer function $T_j(s)$. |
| Soft: $f_j(x) = \|W_L(s)T_j(s)W_R(s)\|_2$ |
| Hard: $\|W_L(s)T_j(s)W_R(s)\|_2 < 1$ |

| Properties | Meaning |
|---|---|
| Openings | Loop openings to be enforced when evaluating this requirement |

As another example, the hard and/or soft constraint may include a constraint on the shape of an open-loop gain of a single input and single output (SISO) and/or MIMO loop associated with model 400. In some implementations, the constraint on the shape of the open-loop gain may be input as program code, via a TuningGoal.LoopShape object, with the following properties:

| Class: TuningGoal.LoopShape |
|---|
| Purpose: Shape of the open-loop gain of SISO or MIMO feedback loops. |

| Properties | Meaning |
|---|---|
| LoopTransfer | Locations where the loop transfer function is measured (may be registered as loop switches) |
| LoopGain | Desired loop shape (e.g., ZPK model) |
| CrossTol | Tolerance on gain crossover location |
| LoopScaling | Enable/disable automatic scaling of loop channel (default = 'on') |
| Focus | Frequency interval of interest (default = [0, Inf]). |
| Name | Requirement name |
| Models | Models to which the requirement applies (in multi-model context). Default value NaN means "all models" |
| Openings | Loop openings to be enforced when evaluating this requirement |

As another example, the hard constraint may include enforcing the stability of a tunable element of the model. In some implementations, the constraint on the stability of a tunable element may be input as program code, via a TuningGoal.StableBlock object, with the following properties:

| Class: TuningGoal.StableBlock |
|---|
| Purpose: Constrain the dynamics of specific tunable block |

| Properties | Meaning |
|---|---|
| Block | Block name |
| MinDecay | Minimum decay rate of block poles |
| MaxRate | Maximum magnitude of block poles (fast dynamics) |
| Name | Requirement name |

As another example, the hard constraint may include enforcing the closed-loop stability of a specified loop. In some implementations, the constraint on the stability of a loop may be input as program code, via a TuningGoal.Poles object, with the following properties:

| Class: TuningGoal.Poles |
|---|
| Purpose: Constrain the closed-loop poles |

| Properties | Meaning |
|---|---|
| MinDecay | Minimum decay rate of closed-loop poles |
| MaxRate | Maximum magnitude of closed-loop poles (fast dynamics) |
| Name | Requirement name |

-continued

Class: TuningGoal.Poles
Purpose: Constrain the closed-loop poles

| Properties | Meaning |
|---|---|
| Models | Models to which the requirement applies (in multi-model context). Default value NaN means "all models" |
| Openings | Loop openings to be enforced when evaluating this requirement |

As another example, the hard and/or soft constraint may include a constraint on specified gain and/or phase margins associated with model 400. In some implementations, the constraint on the specified gain and/or phase margins may be input as program code, via a TuningGoal.Margins object, with the following properties:

Class: TuningGoal.Margins
Purpose: Enforce specified gain and phase margins (in the LOOPMARGIN sense)

| Properties | Meaning |
|---|---|
| LoopTransfer | Locations where the SISO or MIMO stability margins are assessed (loop switch locations) |
| GainMargin | Desired gain margin |
| PhaseMargin | Desired phase margin |
| Focus | Frequency interval of interest (default = [0, Inf]). |
| Name | Requirement name |
| Models | Models to which the requirement applies (in multi-model context). Default value NaN means "all models" |
| Openings | Loop openings to be enforced when evaluating this requirement |

As another example, the hard and/or soft constraint may include a constraint on specified gain and/or phase margins when allowing gain and/or phase variation at both the inputs and outputs of fixed portion 410 of model 400. In some implementations, the constraint on the specified gain and/or phase margins when allowing gain and/or phase variation may be input as program code, via a TuningGoal.ioMargins object, with the following properties:

Class: TuningGoal.ioMargins
Purpose: Enforce specified margins allowing for gain/phase variations at both the inputs and outputs of the plant (see MMIO in LOOPMARGIN)

| Properties | Meaning |
|---|---|
| Input | Input points (loop switch locations) |
| Output | Output points (loop switch locations) |
| GainMargin | Desired gain margin |
| PhaseMargin | Desired phase margin |
| Focus | Frequency interval of interest (default = [0, Inf]). |
| Name | Requirement name |
| Models | Models to which the requirement applies (in multi-model context). Default value NaN means "all models" |
| Openings | Loop openings to be enforced when evaluating this requirement |

As shown in FIG. 5, process 500 may include applying an optimization algorithm to the control system model, based on the hard constraint and/or the soft constraint, to generate parameter values for the tunable parameters (block 540). For example, user device 210 may apply an optimization algorithm to model 400. The optimization algorithm may determine parameter values, for the tunable parameters, that satisfy the hard constraints and/or the soft constraints received by user device 210.

In some implementations, the optimization algorithm may solve for x in the optimization problem:

$$\min_x \max_j f_j(x) \text{ subject to } \begin{cases} \max_k g_k(x) < 1 \\ x_{lb} \le x \le x_{ub} \\ T(s) \text{ stable} \end{cases}$$

where x represents a tunable parameter of model 400, $f_j(x)$ represents a j-th soft constraint of a set of J (J≥1) soft constraints $[f_1(x), \ldots f_J(x)]$, $g_k(x)$ represents a k-th hard constraint of a set of K (K≥1) hard constraints $[g_1(x), \ldots g_K(x)]$, $x_{lb}$ represents a lower bound of tunable parameter x, $x_{ub}$ represents an upper bound of tunable parameter x, T(s) represents a transfer function of frequency s, and "T(s) stable" represents a stability constraint on the transfer function (e.g., the transfer function T(s) must be stable).

In some implementations, the optimization algorithm may solve for x, where x represents the set of tunable parameters, in the following optimization problem:

$$\text{minimize } f(x) \text{ subject to } g(x) \le c$$

where c is a real number. f(x) and g(x) may represent max-functions of the form:
$f(x) = \max f_i(x)$, where $i=1, \ldots, n_f$, and $n_f$ represents the quantity of soft constraints;
$g(x) = \max g_j(x)$, where $j=1, \ldots, n_g$, and $n_g$ represents the quantity of hard constraints.

Individual branches $f_i(x)$ and $g_j(x)$ may express a variety of closed-loop and/or open-loop requirements, including $H_\infty$-norm requirements, which may be limited to specific frequency bands, $H_2$-norm requirements or variance constraints, loop-shaping specifications (e.g., at prescribed loop-opening sites), constraints on closed-loop dynamics, MIMO or SISO stability margins (e.g., at specified loop-opening sites), and/or other requirements or constraints discussed herein.

In some implementations, the optimization problem (minimize f(x) subject to g(x)≤c) may be solved through a sequence of problems $P_\mu$, where $$P_\mu: \text{minimize}_x h_\mu(x) = \max\{f(x), \mu g(x)\}$$

where μ is determined by using a bisection method. If constraints g(x)≤c are not competing with f, then minimizing f may solve the optimization problem. Otherwise, when the soft and hard constraints are competing, solving the optimization problem may include decreasing or increasing the value of μ (e.g., based on whether a constraint is feasible or not), resulting in final binding constraints of $g(x_\mu)=c$.

In some implementations, the values of μ may be determined as follows:
 1) Initialize a lower bound $\mu_{lower}=0$.
 2) Find a strictly feasible point $g(x_f)<c$. Stop if there is no strictly feasible point (e.g., if a solution is infeasible). Otherwise, go to step 3.
 3) Initialize an upper bound $\mu_{upper}=f(x_f)/g(x_f)$, and set $\mu=(\mu_{upper}+\mu_{lower})/2$.
 4) Stop if $|\mu_{upper}-\mu_{lower}|\le\epsilon$, where ϵ is a value that represents a stopping criterion. Otherwise, solve problem $P_\mu$ for $x_\mu$.
 5) If $g(x_\mu)>c$, set $\mu_{lower}=\mu$. Otherwise, set $\mu_{upper}=\mu$.
 6) Update $\mu=(\mu_{upper}+\mu_{lower})/2$ and return to step 4.

As shown in FIG. 5, process 500 may include providing the parameter values (block 550). For example, user device 210 may provide the parameter values via a user interface and/or may store the parameter values. In some implementations, user device 210 may provide the parameter values to model 400. Additionally, or alternatively, user device 210 may execute model 400 using the parameter values.

While a series of blocks has been described with regard to FIG. 5, the blocks and/or the order of the blocks may be modified in some implementations. Additionally, or alternatively, non-dependent blocks may be performed in parallel.

Figure 6:
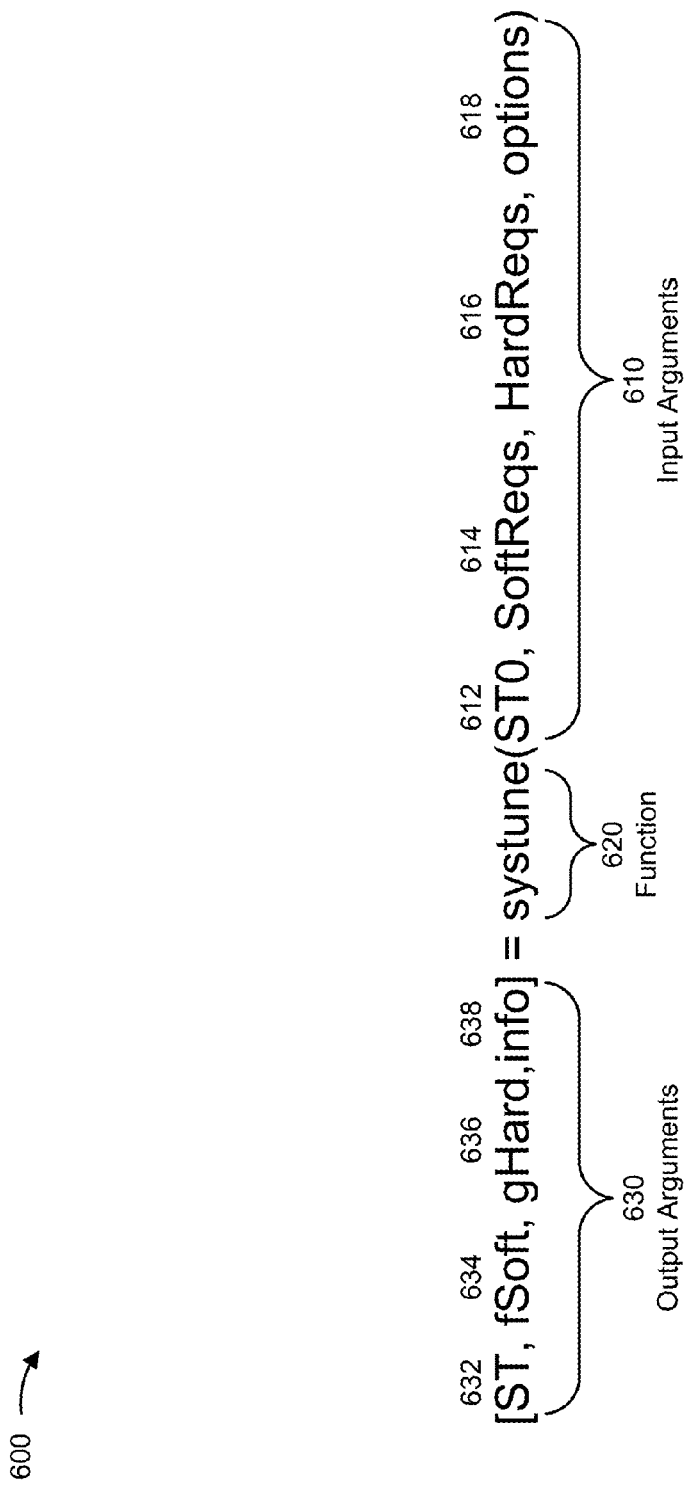
FIG. 6 is a diagram of example program code for generating parameter values for a control system model.

FIG. 6 is a diagram of example program code 600 for generating parameter values for a control system model. As shown in FIG. 6, program code 600 may include input arguments 610, a function 620, and output arguments 630.

Input arguments 610 may include a model argument (ST0) 612, a soft constraint argument (SoftReqs) 614, a hard constraint argument (HardReqs) 616, and an options argument (options) 618. Each input argument 610 may include an object or an array of objects. For example, input arguments 610 may include one or more models, zero or more soft constraints, zero or more hard constraints, and zero or more options.

Model argument 612 may identify a model of an untuned control system, such as control system model 400. For example, model argument 612 may include a generalized state space (genss) description of an untuned control system and/or a linearized block diagram model. Model argument 612 may also identify tunable parameters of model 400.

Soft constraint argument 614 may identify one or more soft constraints (e.g., of an optimization problem) used to generate parameter values of tunable parameters identified by model argument 612. In some implementations, soft constraint argument 614 may include a vector (e.g., an array) of soft constraints with tunable parameter values to be minimized.

Hard constraint argument 616 may identify one or more hard constraints (e.g., of an optimization problem) used to generate parameter values of tunable parameters identified by model argument 612. In some implementations, hard constraint argument 616 may include a vector (e.g., an array) of hard constraints with tunable parameter values to be constrained (e.g., to satisfy a threshold value).

Options argument 618 may identify one or more options (e.g., associated with an optimization problem and/or an optimization algorithm used to solve the optimization problem) used to generate parameter values of tunable parameters identified by model argument 612. For example the options may include an option that specifies an output of the optimization algorithm, a quantity of iterations of the optimization algorithm, a quantity of times the optimization algorithm is to be run (e.g., applied to an optimization problem), whether or not to parallel process the optimization algorithm runs, a target value and/or minimum value for a tunable parameter associated with a soft constraint, a tolerance and/or accuracy of the target value and/or minimum value (e.g., a tolerance for terminating the optimization), an expected optimal value of a tunable parameter associated with a soft constraint, a scaling order associated with the optimization algorithm, a minimum decay rate of close-loop poles of model 400, a tolerance on a decay rate of non-minimal modes associated with model 400, or the like.

In some implementations, options may include default values, as shown in the following table:

| Option name | Default | Meaning/purpose |
| --- | --- | --- |
| Display | 'final' | Controls a value output to a user interface after optimization algorithm is complete |
| MaxIter | 300 | Maximum number of solver iterations |
| RandomStart | 0 | Number of randomized optimization algorithm runs |
| UseParallel | false | Enable parallel processing of optimization algorithm runs |
| SoftTarget | 0 | Target value for minimum value of soft constraints |
| SoftTol | 1e−3 | Desired accuracy on minimum value of soft constraints |
| SoftScale | 1 | Expected best value of soft constraints |
| ScalingOrder | 0 | D Scaling order |
| MinDecay | 1e−6 | Minimum decay rate of closed-loop poles |
| TolDecay | 1e−6 | Tolerance on decay rate of non-minimal modes Uncontrollable or unobservable modes in the marginally stable strip $\|Re(s)\| < TolDecay * (1 + \|s\|)$ are considered stable. |

Function 620 may identify a function (e.g., systune) that applies an optimization algorithm to the model identified by model argument 612, subject to the soft constraints identified by soft constraint argument 614 and/or the hard constraints identified by hard constraint argument 616, and based on options identified by options argument 618. For example, the systune function may return parameter values of the tunable parameters that best meet the soft constraints, and subject to satisfying the hard constraints.

Output arguments 630 may include a tuned model argument (ST) 632, an optimized soft constraint argument (fSoft) 634, an optimized hard constraint argument (gHard) 636, and an information argument (info) 638. Each output argument 630 may include an object or an array of objects. Output arguments 630 may be generated by applying function 620 to input arguments 610.

Tuned model argument 632 may identify a model of a tuned control system, such as control system model 400. For example, tuned model argument 632 may include a generalized state space (genss) description of a tuned control system and/or a linearized block diagram model. Tuned model argument 632 may also identify parameter values of tunable parameters of model 400.

Optimized soft constraint argument 634 may identify a best achieved soft constraint value (e.g., for each of the soft constraints) based on applying the optimization algorithm to the untuned model. Optimized hard constraint argument 636 may identify a best achieved hard constraint value (e.g., for each of the hard constraints) based on applying the optimization algorithm to the untuned model.

Information argument 638 may identify information associated with an optimization algorithm used to generate parameter values of tunable parameters identified by model argument 612. For example, the information may include a quantity of optimization runs, a quantity of iterations performed during an optimization run, a best generated soft constraint value (e.g., for each soft constraint), a best generated hard constraint value (e.g., for each hard constraint), or the like.

Figure 7A:
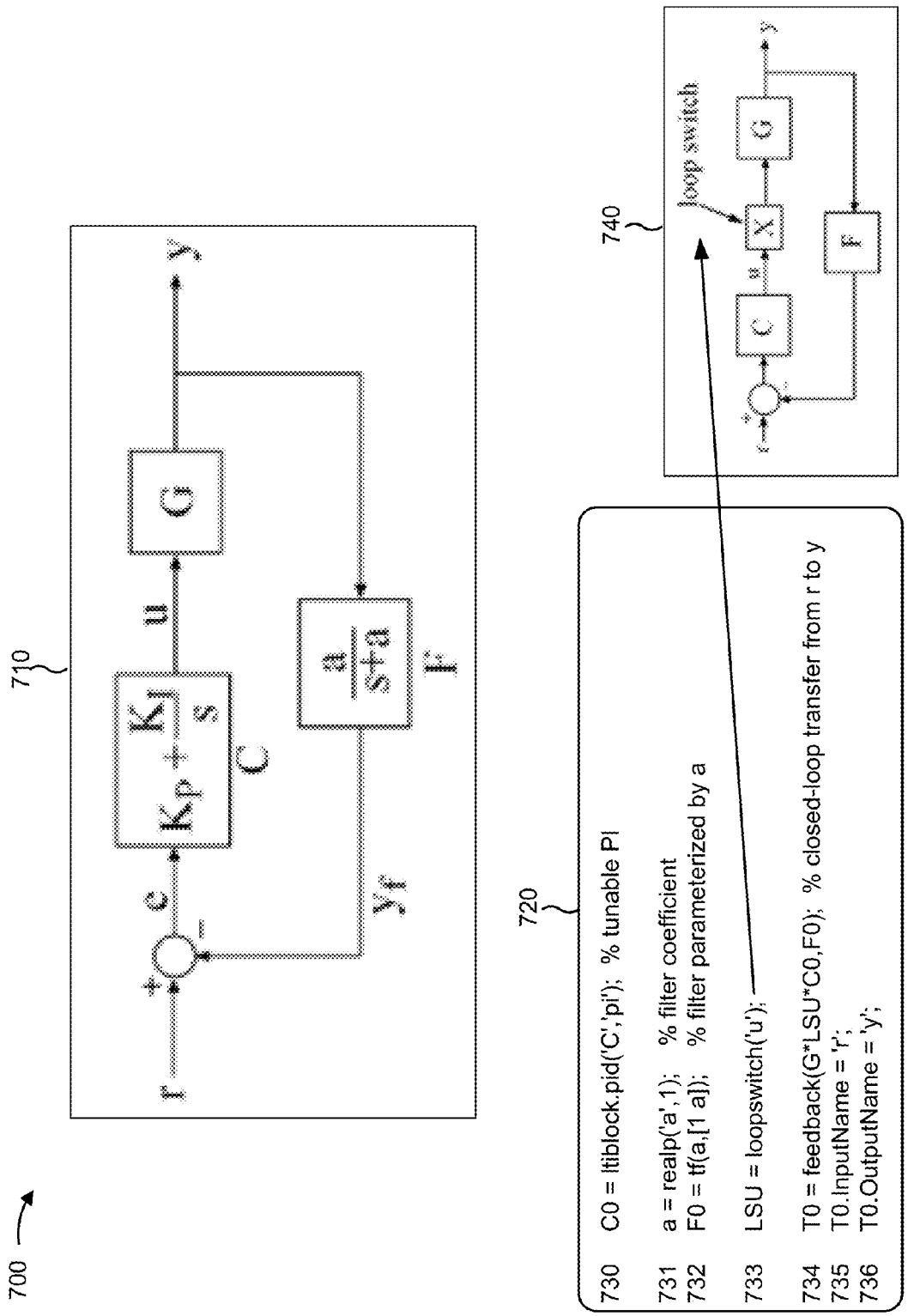
FIGS. 7A and 7B are diagrams of an example implementation relating to the process shown in FIG. 5.
Figure 7B:
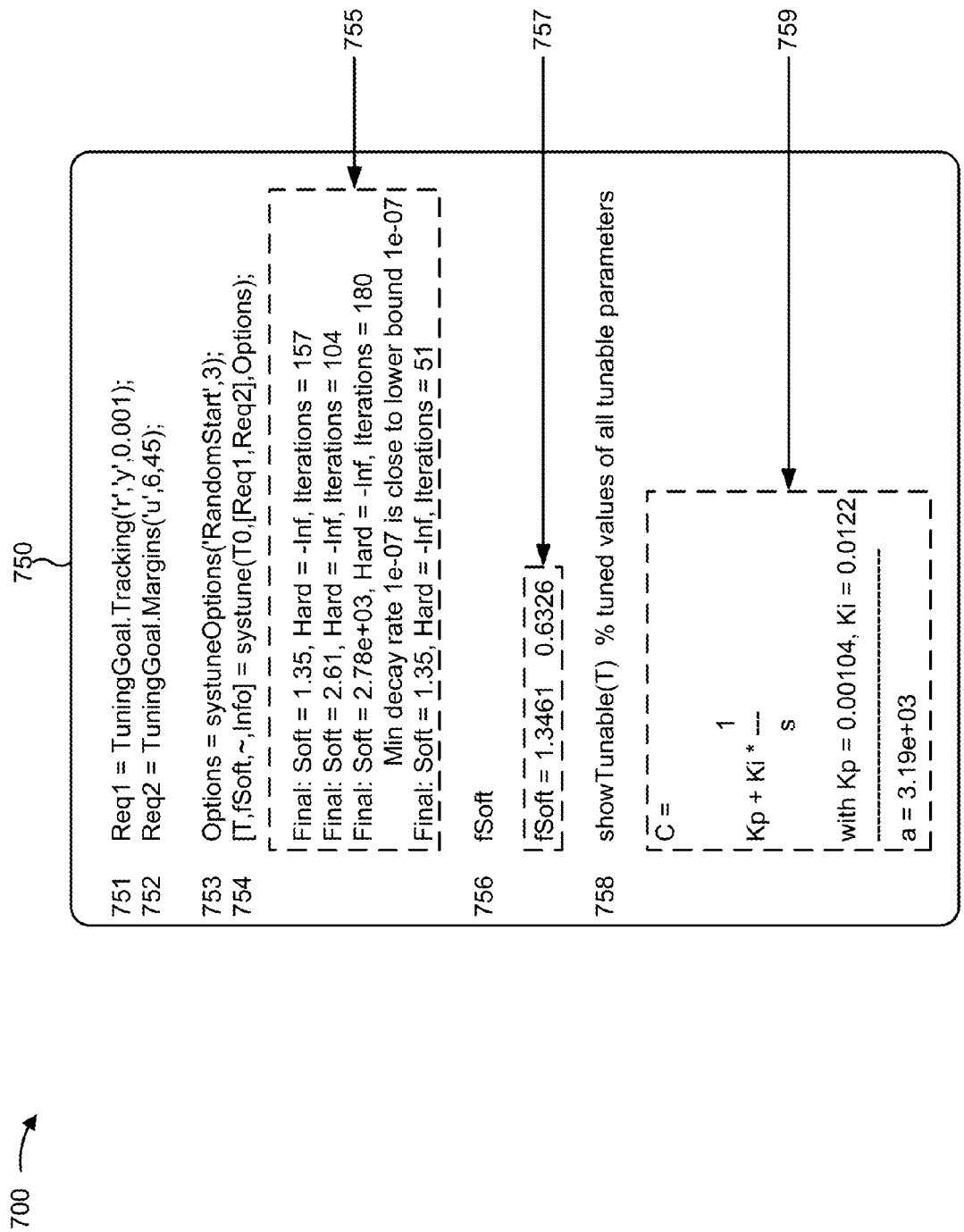

FIGS. 7A and 7B are diagrams of an example implementation 700 relating to process 500 (FIG. 5). In implementation 700, assume that a user wants to optimize parameters of a control system shown in FIG. 7A.

FIG. 7A shows a model 710 of a control system used to position the head of a hard drive head disk assembly on a disk track. Model 710 may include a proportional and integral ("PI") controller (C), a fixed portion (G), and a low-pass filter (F). The head position (y) may be determined by the fixed portion based on a control signal (u) input from the controller to the fixed portion. The controller may determine the control signal based on an error signal (e) received by the controller. The error signal may include a combination of a reference signal (r), which may be input to the control system, and an adjusted feedback signal ($y_f$). The adjusted feedback signal may be determined by the low-pass filter, based on the feedback/output signal (y) received by the low-pass filter.

In some implementations, user device 210 may build model 710 based on program code 720 (e.g., program code input by a user). Program code 720 may include code portions 730-736, as shown. User device 210 may execute code portions 730-736 to create model 710 and to specify tunable parameters of model 710. In example implementation 700, assume the user wants the tunable parameters to include the value of $K_P$ (sometimes referred to in the figures as Kp) and $K_I$ (sometimes referred to in the figures as Ki) in the PI controller and the value of a in the low-pass filter.

Code portion 730 may create the PI controller, and may specify that the parameters of the PI controller (e.g., $K_P$ and $K_I$) are tunable parameters. Code portions 731 and 732 may create the low-pass filter, and may specify the parameter of the low-pass filter (e.g., "a") as a tunable parameter.

Code portion 733 may create a loop switch in model 710, as shown by model 740, and may specify a location for the loop switch. A loop switch may facilitate open-loop analysis of a control system model, and may permit a user to specify open-loop constraints, such as desired stability margins. For example, the following constraints may act on open-loops: TuningGoal.Rejection constraints, TuningGoal.LoopShape constraints, TuningGoal.Margins constraints, TuningGoal.ioMargins constraints, and/or TuningGoal.StableLoop constraints.

Code portions 734-736 may create model 710/740 by specifying connections between elements in the model. The result of execution of code portions 730-736 may include model 710/740, which may represent a generalized state space model that depends on tunable parameters of controller C (e.g., $K_P$ and $K_I$) and low-pass filter F (e.g., "a").

FIG. 7B shows program code 750 used to specify design requirements (e.g., constraints) of the control system modeled by model 710. In implementation 700, assume that the user wants the control system to ensure that the head position (y) of the hard drive head disk assembly tracks the reference signal (r) with a one millisecond response time. Code portion 751 may specify this requirement as:

Req1=TuningGoal.Tracking('r','y',0.001).

Further assume that the user wants the feedback loop of model 710 to have six (6) decibels (dBs) of gain margin and forty-five (45) degrees of phase margin. Code portion 752 may specify this requirement as:

Req2=TuningGoal.Margins('u',6,45).

Note that the margins requirements applies to the open-loop response measured at the input (u) to the fixed portion (G) of the model, which is the location marked by the loop switch block created using program code 720 (FIG. 7A).

Further assume that the user wants to use three random starting points in the optimization runs to improve the chances of calculating a globally optimal design. Code portion 753 may specify this optimization algorithm option as:

Options=systuneOptions('RandomStart',3).

Code portion 754 may apply the optimization algorithm to model 710/740, created by executing program code 720. The optimization algorithm may minimize the soft constraints specified by code portions 751-752. In this example, assume that there are no hard constraints. The optimization algorithm may use the options specified by code portion 753. The optimization algorithm may normalize the constraints so that a constraint is satisfied when a value of the constraint is less than one.

Executing code portion 754 (e.g., [T,fSoft,~,Info]=systune (T0,[Req1,Req2], Options)) may return result 755. Note that result 755 includes values for the soft constraints, but no value (e.g., -Inf) for the hard constraints, because the optimization algorithm did not include any hard constraints. Result 755 may also indicate a number of iterations in each optimization run.

Executing code portion 756 (e.g., fSoft) may return result 757, which may identify the tuned value of each (soft) constraint. For example, result 757 (fSoft=1.3461, 0.6326) indicates that the first soft constraint (e.g., the tracking constraint) is slightly violated, as indicated by the fSoft value being greater than 1 (e.g., 1.3461), and the second soft constraint (e.g., the margins constraint) is satisfied, as indicated by the fSoft value being less than 1 (e.g., 0.6326).

Executing code portion 758 (e.g., showTunable(T)) may return result 759, which may identify the tuned values of all tunable parameters of model 710/740. For example, result 759 indicates that the tuned value of $K_P$ is 0.00104, the tuned value of $K_I$ is 0.0122, and the tuned value of a is 3.19e+03. A user may use the returned values of $K_P$, $K_I$, and a to design the control system modeled by model 710/740.

Figure 8A:
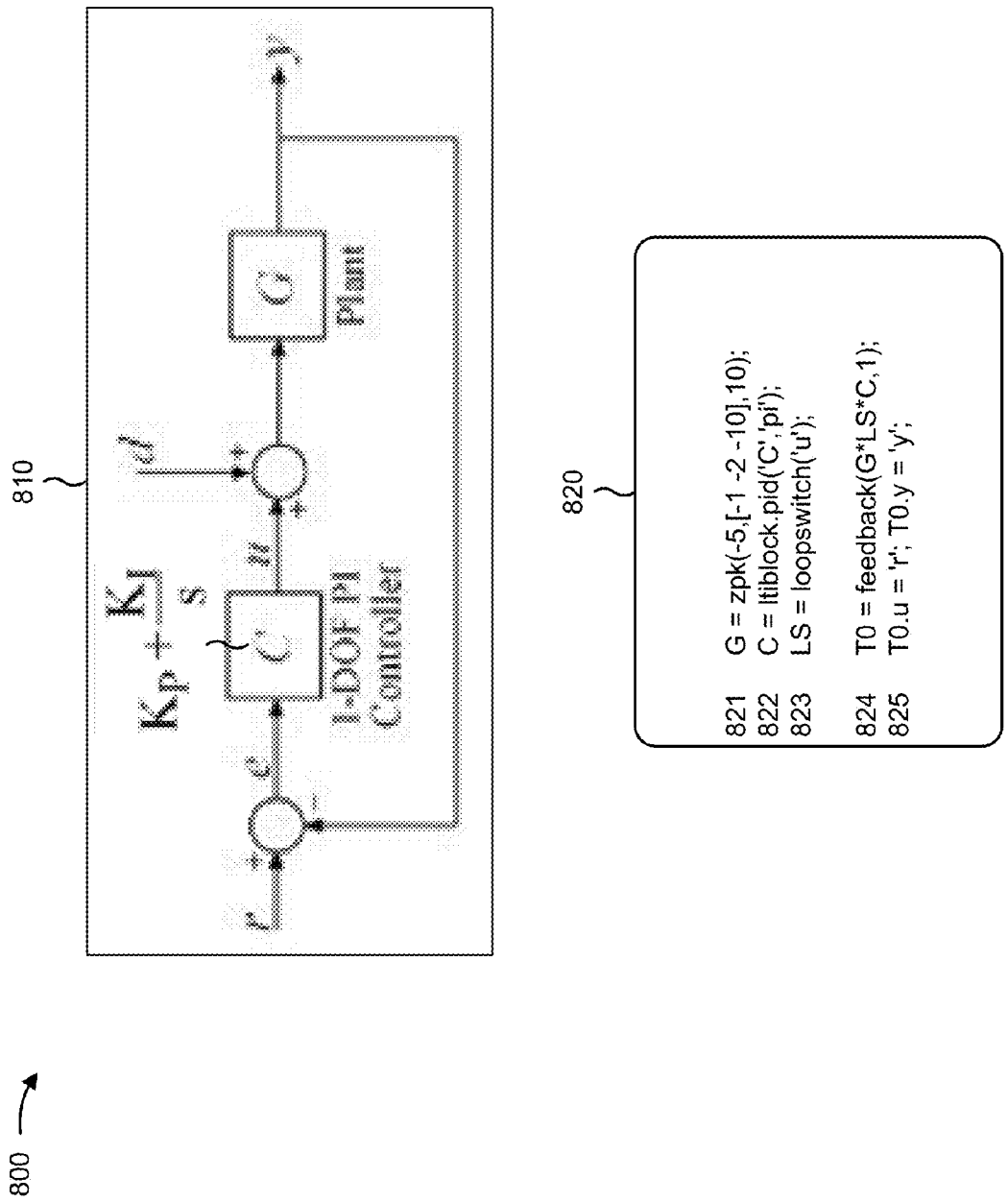

FIGS. 8A and 8B are diagrams of an example implementation 800 relating to process 500 (FIG. 5). In implementation 800, assume that a user wants to optimize parameters of a control system shown in FIG. 8A.

FIG. 8A shows a model 810 of a control system. Model 810 may include a one degree-of-freedom (1-DOF) proportional and integral ("PI") controller (C), and a fixed portion (G). The output signal (y) may be determined by the fixed portion based on a combined signal (u+d), which may include a combination of a control signal (u) from the controller and a disturbance signal (d). The controller may determine the control signal (u) based on an error signal (e) received by the controller. The error signal may include a combination of a reference signal (r), which may be input to the control system, and the output signal (y).

In some implementations, user device 210 may build model 810 based on program code 820 (e.g., program code input by a user). Program code 820 may include code portions 821-825, as shown. User device 210 may execute code portions 821-825 to create model 810 and to specify tunable parameters of model 810. In example implementation 800, assume the user wants the tunable parameters to include the value of $K_P$ and $K_I$ in the PI controller.

Code portion 821 may create the fixed portion (e.g., plant G), which may be modeled, based on code portion 821, as:

$$G(s) = \frac{10(s+5)}{(s+1)(s+2)(s+10)}$$

where G(s) represents the transfer function for the fixed portion as a function of frequency in the s-domain.

Code portion 822 may create the PI controller, and may specify that the parameters of the PI controller (e.g., $K_P$ and $K_I$) are tunable parameters. Code portion 823 may create a loop switch in model 810 where the disturbance signal enters the control system (e.g., between the controller and the fixed portion). Code portions 824-825 may create model 810 by specifying connections between elements in the model.

Execution of code portions 821-825 may create model 810, which may represent a generalized state space model that depends on tunable parameters of controller C (e.g., $K_P$ and $K_I$).

FIG. 8B shows program code 830 used to specify design requirements (e.g., constraints) of the control system modeled by model 810. In implementation 800, assume that the user wants to control the system with a first hard constraint to limit the bandwidth to about 1 rad/s and force a roll-off of −20 db/decade past 4 rad/s, a second hard constraint to specify the minimum disturbance attenuation in the control bandwidth. The second hard constraint is limited to the frequency band [0, 0.5] rad/s, and the attenuation factor decreases as the reciprocal of frequency (e.g., no attenuation at crossover). Further, assume that the user wants to control the system with a soft constraint that specifies a response time of about 2 seconds in the output (y) to step changes in (r). Execution of code portions 831-838 may set up these constraints, with R1 representing a hard gain constraint (e.g., the first hard constraint), R2 representing a hard rejection constraint (e.g., the second hard constraint), and R3 representing a soft tracking constraint (e.g., the soft constraint).

Code portion 839 may apply the optimization algorithm to model 810, created by executing program code 820. The optimization algorithm may minimize the soft constraints and satisfy the hard constraints specified by code portions 831-838. The optimization algorithm may normalize the constraints so that a constraint is satisfied when a value of the constraint is less than one.

Executing code portion 839 (e.g., T1=systune(T0, R3, [R1, R2])) may return result 840. Result 840 indicates that the hard constraints are satisfied (e.g., with a value less than 1, or 0.99967), and the soft constraint (e.g., the tracking constraint) is slightly violated, as indicated by the Soft value being greater than 1 (e.g., 1.52).

Executing code portion 841 (e.g., showTunable(T1)) may return result 842, which may identify the tuned values of all tunable parameters of model 810. For example, result 842 indicates that the tuned value of $K_P$ of controller C is 1.94, and the tuned value of $K_I$ of controller C is 2.13. A user may use the returned values of $K_P$ and $K_I$ to design the control system modeled by model 810.

FIGS. 9A-9D are diagrams of yet another example implementation 900 relating to process 500 (FIG. 5). Example implementation 900 shows an example of optimizing a control system that may operate under multiple different operating modes.

Figure 9A:
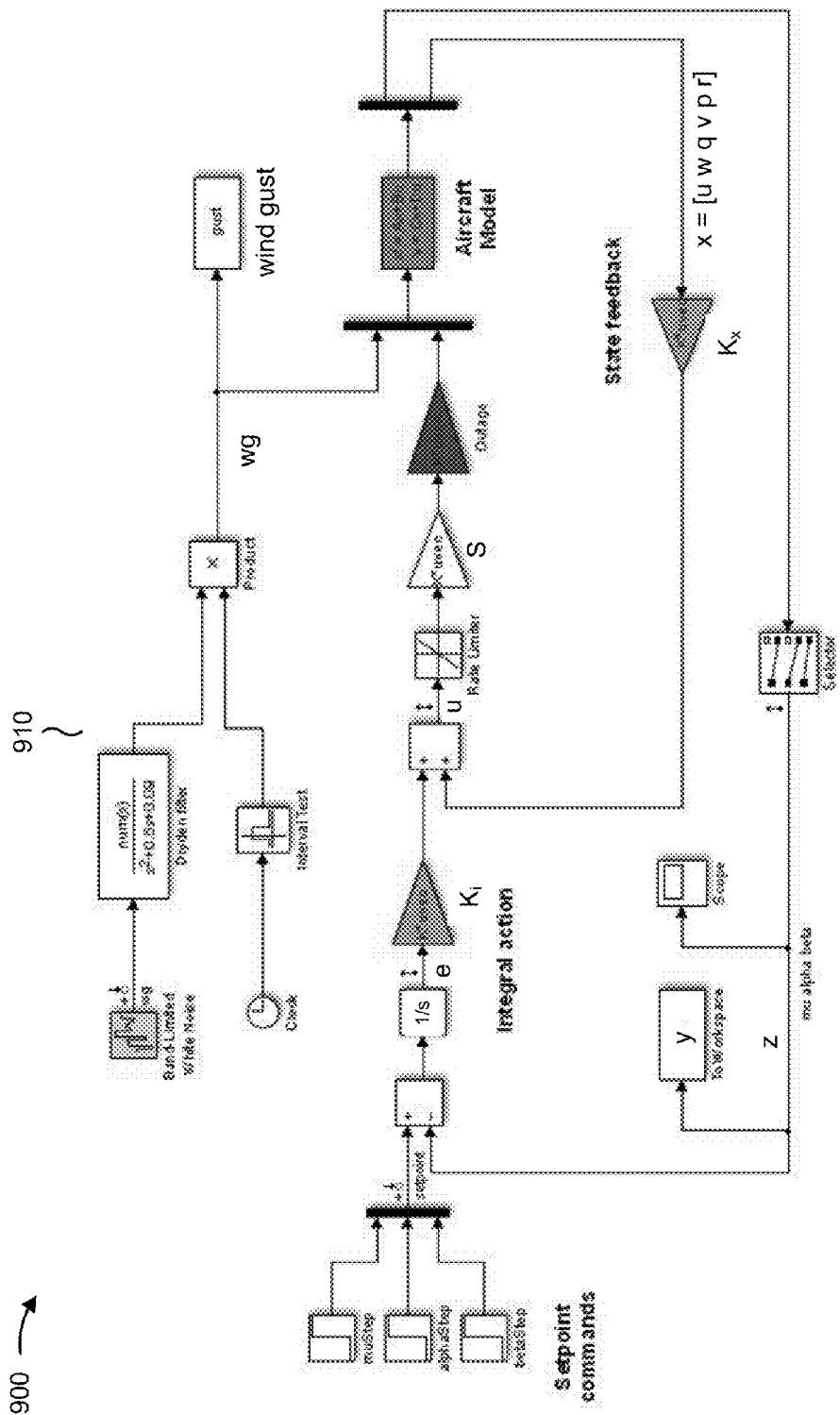

FIG. 9A shows a model 910 of a flight control system. Assume that model 910 is a model of a fault-tolerant flight control system of an aircraft. The aircraft may experience an outage in an elevator actuator that controls an elevator control surface of the aircraft, and/or may experience an outage in an aileron actuator that controls an aileron control surface of the aircraft. A user may want to design the flight control system to maintain stability and meet performance and comfort requirements (e.g., constraints) in both normal operation and degraded operation, where some actuators may no longer operate.

Assume that the aircraft is modeled as a rigid 6th-order state-space system with the following state variables:
- u: x-body axis velocity
- w: z-body axis velocity
- q: pitch rate
- v: y-body axis velocity
- p: roll rate
- r: yaw rate.

As shown in FIG. 9B, program code 920 may be used to set up model 910 and various operational modes associated with the flight control system. Code portion 921 may load flight control system model 910 (FIG. 9A). Code portion 922 may specify the operational modes associated with various performance degradations (e.g., outages) of flight control system elements (e.g., elevators and/or ailerons).

As shown in FIG. 9C, program code 930 may be used to specify constraints associated with model 910. For example, code portion 931 may specify weights "We" and "Wu" that model the tuning knobs, of the flight control system, that control responsiveness and control effort. Code portion 932 may specify a soft tracking requirement (e.g., using a cost function) for the normal operating mode. Code portion 933 may specify a similar soft tracking requirement for the outage scenarios, with a relaxed performance weight for We.

Code portion 934 may specify a hard requirement that alleviates the effects of wind gusts on the aircraft when the aircraft is operating in the normal operating mode. Code portion 935 may specify a similar hard requirement for the outage scenarios, with a relaxed constraint. Code portions 934 and 935 may limit the variance of the error signal (e) due to white noise (wg) driving the wind gust model. Code portion 936 may set up the model using a wind gust speed of 10 miles per hour, and may initialize values for the tunable state-feedback gain ($K_x$, a three by six matrix), and the tunable integrator gain ($K_i$, a three by three matrix).

As shown in FIG. 9D, program code 940 may be used to calculate optimal parameter values for the tunable parameters of model 910. Code portion 941 may set up a closed loop model for each of the nine flight conditions (e.g., one normal operating scenario and eight outage scenarios). The resulting generalized state-space array (T0) represents nine tunable models with tunable parameters Ki and Kx.

Code portion 942 may be used to apply the optimization algorithm to the normal operating mode. Execution of code portion 942 may produce result 943. Result 943 indicates that the hard constraint is satisfied (e.g., with a value less than 1, or 0.99662), and the minimal value of the soft constraint is 22.6. As compared to the previous examples (FIGS. 7A-7B and 8A-8B), the value of the soft constraint in this example (FIGS. 9A-9D) is not less than one because a goal of the optimization algorithm is to minimize a value of the soft constraint, which may not result in a value less than one.

Code portion 944 may be used to apply the optimization algorithm to the outage operating modes. Execution of code portion 944 may produce result 945. Result 945 indicates that the hard constraint is satisfied (e.g., with a value less than 1, or 0.99987), and the minimal value of the soft constraint is 25.7. A comparison of the results shows that performance of the flight control system is slightly worse when the constraints are satisfied for all operating modes (e.g., a performance value of 25.7) than when the constraints are satisfied for only the normal operating mode (e.g., a performance value of 22.6). A user may use the returned tunable parameter values to design the flight control system modeled by model 910.

The foregoing disclosure provides illustration and description, but is not intended to be exhaustive or to limit the implementations to the precise form disclosed. Modifications and variations are possible in light of the above disclosure or may be acquired from practice of the implementations.

As used herein, component is intended to be broadly construed as hardware, firmware, or a combination of hardware and software.

As used herein, program code is to be broadly interpreted to include text-based code that may not require further processing to execute (e.g., C++ code, Hardware Description Language (HDL) code, very-high-speed integrated circuits (VHSIC) HDL(VHDL) code, Verilog, Java, and/or other types of hardware or software based code that may be compiled and/or synthesized); binary code that may be executed (e.g., executable files that may directly be executed by an operating system, bitstream files that can be used to configure a field programmable gate array (FPGA), Java byte code, object files combined together with linker directives, source code, makefiles, etc.); text files that may be executed in conjunction with other executables (e.g., Python text files, a collection of dynamic-link library (DLL) files with text-based combining, configuration information that connects pre-compiled modules, an extensible markup language (XML) file describing module linkage, etc.); etc. In one example, program code may include different combinations of the above-identified classes (e.g., text-based code, binary code, text files, etc.). Additionally, or alternatively, program code may include code generated using a dynamically-typed programming language (e.g., the M language, a MATLAB® language, a MATLAB-compatible language, a MATLAB-like language, etc.) that can be used to express problems and/or solutions in mathematical notations. Additionally, or alternatively, program code may be of any type, such as a function, a script, an object, etc., and a portion of program code may include one or more characters, lines, etc. of the program code.

Some implementations are described herein in conjunction with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and control hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A device, comprising:
one or more processors to:
receive a control system model for modeling a control system that controls a system,
the control system model including:
a fixed portion that models elements of the control system, and
a tunable portion that models elements of the control system used to control the elements modeled by the fixed portion,
the fixed portion and the tunable portion interacting with one another in a multiple-input, multiple-output (MIMO) feedback loop configuration;
receive information that identifies a tunable parameter of the tunable portion of the control system model;
receive information that identifies a hard constraint associated with the control system model,
the hard constraint identifying a first constraint that is to be satisfied;
receive information that identifies a soft constraint associated with the control system model,
the soft constraint identifying a second constraint that includes a value to be reduced;
calculate a parameter value for the tunable parameter by applying an optimization algorithm to the control system model,
the optimization algorithm including a first function associated with the soft constraint and subject to a second function associated with the hard constraint; and
provide the parameter value.

2. The device of claim 1, where the control system model represents a plurality of models of the control system,
each of the plurality of models representing operation of the control system under different degrees of degradation or performance; and
where the one or more processors, when calculating the parameter value for the tunable parameter, are further to:
calculate the parameter value for the tunable parameter for the plurality of models.

3. The device of claim 1, where at least one of the hard constraint or the soft constraint includes at least one of:
a setpoint tracking constraint;
a disturbance rejection constraint;
a constraint on overshoot in a step response;
a constraint on gain of a transfer function;
a constraint on gain of a frequency-weighted transfer function;
a constraint on signal variance amplification;
a constraint on frequency-weighted variance amplification;
a minimum gain constraint for an open-loop response;
a maximum gain constraint for the open-loop response;
a target shape constraint for the open-loop response;
a constraint on sensitivity of a single-input single-output (SISO) or multiple-input multiple-output (MIMO) loop;
a minimum stability margin constraint for a SISO or MIMO loop;
a constraint on closed-loop dynamics; or
a constraint on controller dynamics.

4. The device of claim 1, where the one or more processors, when calculating the parameter value for the tunable parameter by applying the optimization algorithm, are further to:
calculate the parameter value using the optimization algorithm expressed as:

$$\min_{x} \max_{j} f_j(x) \text{ subject to } \max_{k} g_k(x) < 1,$$

where x represents the tunable parameter, $f_j(x)$ represents a j-th soft constraint of a set of soft constraints, the set of soft constraints including the soft constraint, and $g_k(x)$ represents a k-th hard constraint of a set of hard constraints, the set of hard constraints including the hard constraint.

5. The device of claim 4, where the optimization algorithm:

$$\min_x \max_j f_j(x)$$

is further subject to:

$x_{lb} \le x \le x_{ub}$, and $T(s)$ stable, where $x_{lb}$ represents a lower bound of the tunable parameter, $x_{ub}$ represents an upper bound of the tunable parameter, and $T(s)$ stable represents a stability constraint on the control system model.

6. The device of claim 1, where the one or more processors, when calculating the parameter value for the tunable parameter by applying the optimization algorithm to the control system model, are further to:

calculate the parameter value by applying the optimization algorithm using a bisection method.

7. The device of claim 1, where the soft constraint includes at least one of:

a gain constraint based on a first weighting function and a transfer function associated with a closed loop of the control system model;

a frequency-weighted gain constraint based on a second weighting function associated with multiple inputs to the closed loop, a third weighting function associated with multiple outputs of the closed loop, and the transfer function, the second weighting function and the third weighting function specifying a maximum gain as a function of frequency;

a setpoint tracking constraint based on the first weighting function and the transfer function;

a disturbance rejection constraint based on the first weighting function and a sensitivity function at a disturbance input of the control system model;

a signal variance amplification constraint based on a threshold value and the transfer function; or a frequency-weighted variance amplification constraint based on a fourth weighting function associated with multiple inputs to the closed loop, a fifth weighting function associated with multiple outputs of the closed loop, and the transfer function, the fourth weighting function and the fifth weighting function specifying a maximum variance amplification as a function of frequency.

8. The device of claim 1, where the hard constraint includes at least one of:

a gain constraint based on a first weighting function and a transfer function associated with a closed loop of the control system model;

a frequency-weighted gain constraint based on a second weighting function associated with multiple inputs to the closed loop, a third weighting function associated with multiple outputs of the closed loop, and the transfer function, the second weighting function and the third weighting function specifying a maximum gain as a function of frequency;

a setpoint tracking constraint based on the first weighting function and the transfer function;

a disturbance rejection constraint based on the first weighting function and a sensitivity function at a disturbance input of the control system model;

a signal variance amplification constraint based on a threshold value and the transfer function; or a frequency-weighted variance amplification constraint based on a fourth weighting function associated with multiple inputs to the closed loop, a fifth weighting function associated with multiple outputs of the closed loop, and the transfer function, the fourth weighting function and the fifth weighting function specifying a maximum variance amplification as a function of frequency.

9. A computer-readable non-transitory medium storing instructions, the instructions comprising:

one or more instructions that, when executed by a processor, cause the processor to:

receive a computer-executable control system model for modeling a control system that controls a system, the control system model including:

a fixed portion that models elements of the control system, and a tunable portion that models elements of the control system used to control the elements modeled by the fixed portion, the fixed portion and the tunable portion interacting with one another in a multiple-input, multiple-output (MIMO) feedback loop configuration;

receive information that identifies a tunable parameter of the tunable portion of the control system model;

receive information that identifies:

a hard constraint associated with the control system model, the hard constraint identifying a first constraint that is to be satisfied; and a soft constraint associated with the control system model, the soft constraint identifying a second constraint that includes a value to be reduced;

calculate a parameter value for the tunable parameter by applying an optimization algorithm to the control system model, the optimization algorithm including a first function associated with the soft constraint and subject to a second function associated with the hard constraint; and provide the parameter value.

10. The computer-readable non-transitory medium of claim 9, where the control system model represents a plurality of models of the control system, each of the plurality of models representing operation of the control system under different degrees of degradation or performance; and where the one or more instructions, that cause the processor to calculate the parameter value for the tunable parameter, further cause the processor to:

calculate the parameter value for the tunable parameter for the plurality of models.

11. The computer-readable non-transitory medium of claim 9, where at least one of the hard constraint or the soft constraint includes at least one of:

a setpoint tracking constraint;
a disturbance rejection constraint;
a constraint on overshoot in a step response;
a constraint on gain of a transfer function;
a constraint on gain of a frequency-weighted transfer function;
a constraint on signal variance amplification;
a constraint on frequency-weighted variance amplification;
a minimum gain constraint for an open-loop response;
a maximum gain constraint for the open-loop response;
a target shape constraint for the open-loop response;
a constraint on sensitivity of a single-input single-output (SISO) or multiple-input multiple-output (MIMO) loop;
a minimum stability margin constraint for a SISO or MIMO loop;
a constraint on closed-loop dynamics; or
a constraint on controller dynamics.

12. The computer-readable non-transitory medium of claim 9, where the one or more instructions, that cause the processor to calculate the parameter value for the tunable parameter by applying the optimization algorithm, further cause the processor to:
calculate the parameter value using the optimization algorithm expressed as:

$$\min_x \max_j f_j(x) \text{subject to } \max_k g_k(x) < 1,$$

where x represents the tunable parameter,
$f_j(x)$ represents a j-th soft constraint of a set of soft constraints, the set of soft constraints including the soft constraint, and
$g_k(x)$ represents a k-th hard constraint of a set of hard constraints, the set of hard constraints including the hard constraint.

13. The computer-readable non-transitory medium of claim 12, where the optimization algorithm:

$$\min_x \max_j f_j(x)$$

is further subject to:
$x_{lb} \leq x \leq x_{ub}$, and
T(s) stable,
where $x_{lb}$ represents a lower bound of the tunable parameter,
$x_{ub}$ represents an upper bound of the tunable parameter, and
T(s) stable represents a stability constraint on the control system model.

14. The computer-readable non-transitory medium of claim 9, where at least one of the hard constraint or the soft constraint includes at least one of:
a gain constraint based on a first weighting function and a transfer function associated with a closed loop of the control system model;
a frequency-weighted gain constraint based on a second weighting function associated with multiple inputs to the closed loop, a third weighting function associated with multiple outputs of the closed loop, and the transfer function,
the second weighting function and the third weighting function specifying a maximum gain as a function of frequency;
a setpoint tracking constraint based on the first weighting function and the transfer function;
a disturbance rejection constraint based on the first weighting function and a sensitivity function at a disturbance input of the control system model;
a signal variance amplification constraint based on a threshold value and the transfer function; or
a frequency-weighted variance amplification constraint based on a fourth weighting function associated with multiple inputs to the closed loop, a fifth weighting function associated with multiple outputs of the closed loop, and the transfer function,
the fourth weighting function and the fifth weighting function specifying a maximum variance amplification as a function of frequency.

15. A method, comprising:
receiving a control system model for modeling a control system that controls a system,
the control system model including:
a fixed portion that models elements of the control system, and
a tunable portion that models elements of the control system used to control the elements modeled by the fixed portion,
the receiving the control system model being performed by a device;
receiving information that identifies a tunable parameter of the tunable portion of the control system model,
the receiving information that identifies the tunable parameter being performed by the device;
receiving information that identifies:
a hard constraint associated with the control system model,
the hard constraint identifying a first constraint that is to be satisfied, and
a soft constraint associated with the control system model,
the soft constraint identifying a second constraint that includes a value is be reduced,
the receiving the information being performed by the device;
calculating a parameter value for the tunable parameter by applying an optimization algorithm to the control system model,
the optimization algorithm including a first function associated with the soft constraint and subject to a second function associated with the hard constraint, and
the calculating being performed by the device; and
providing the parameter value,
the providing being performed by the device.

16. The method of claim 15, where the control system model represents a plurality of models of the control system,
each of the plurality of models representing operation of the control system under different degrees of degradation or performance; and
where calculating the parameter value for the tunable parameter further comprises:
calculating the parameter value for the tunable parameter for the plurality of models.

17. The method of claim 15, where at least one of the hard constraint or the soft constraint includes at least one of:
a setpoint tracking constraint;
a disturbance rejection constraint;

a constraint on overshoot in a step response;
a constraint on gain of a transfer function;
a constraint on gain of a frequency-weighted transfer function;
a constraint on signal variance amplification;
a constraint on frequency-weighted variance amplification;
a minimum gain constraint for an open-loop response;
a maximum gain constraint for an open-loop response;
a target shape constraint for the open-loop response;
a constraint on sensitivity of a single-input single-output (SISO) or multiple-input multiple-output (MIMO) loop;
a minimum stability margin constraint for a SISO or MIMO loop;
a constraint on closed-loop dynamics; or
a constraint on controller dynamics.

18. The method of claim 15, where calculating the parameter value for the tunable parameter by applying the optimization algorithm further comprises:
calculating the parameter value using the optimization algorithm expressed as:

$$\min_x \max_j f_j(x) \text{ subject to } \max_k g_k(x) < 1,$$

where x represents the tunable parameter,
$f_j(x)$ represents a j-th soft constraint of a set of soft constraints, the set of soft constraints including the soft constraint, and
$g_k(x)$ represents a k-th hard constraint of a set of hard constraints, the set of hard constraints including the hard constraint.

19. The method of claim 18, where the optimization algorithm:

$$\min_x \max_j f_j(x)$$

is further subject to:
$x_{lb} \leq x \leq x_{ub}$, and
T(s) stable,
where $x_{lb}$ represents a lower bound of the tunable parameter,
$x_{ub}$ represents an upper bound of the tunable parameter, and
T(s) stable represents a stability constraint on the control system model.

20. The method of claim 15, where at least one of the hard constraint or the soft constraint includes at least one of:
a gain constraint based on a first weighting function and a transfer function associated with a closed loop of the control system model;
a frequency-weighted gain constraint based on a second weighting function associated with multiple inputs to the closed loop, a third weighting function associated with multiple outputs of the closed loop, and the transfer function,
the second weighting function and the third weighting function specifying a maximum gain as a function of frequency;
a setpoint tracking constraint based on the first weighting function and the transfer function;
a disturbance rejection constraint based on the first weighting function and a sensitivity function at a disturbance input of the control system model;
a signal variance amplification constraint based on a threshold value and the transfer function; or
a frequency-weighted variance amplification constraint based on a fourth weighting function associated with multiple inputs to the closed loop, a fifth weighting function associated with multiple outputs of the closed loop, and the transfer function,
the fourth weighting function and the fifth weighting function specifying a maximum variance amplification as a function of frequency.

* * * * *